(12) United States Patent
Mihara

(10) Patent No.: US 8,255,797 B2
(45) Date of Patent: Aug. 28, 2012

(54) INFORMATION PROCESSING APPARATUS AND METHOD

(75) Inventor: Makoto Mihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 743 days.

(21) Appl. No.: 12/092,249

(22) PCT Filed: Jan. 19, 2007

(86) PCT No.: PCT/JP2007/051223
§ 371 (c)(1),
(2), (4) Date: Apr. 30, 2008

(87) PCT Pub. No.: WO2007/083846
PCT Pub. Date: Jul. 26, 2007

(65) Prior Publication Data
US 2009/0037516 A1    Feb. 5, 2009

(30) Foreign Application Priority Data
Jan. 23, 2006    (JP) .................................. 2006-014193

(51) Int. Cl.
*G06F 17/27* (2006.01)

(52) U.S. Cl. ........ 715/243; 715/234; 715/235; 715/249; 715/252; 715/253

(58) Field of Classification Search .................. 715/234, 715/235, 243, 249, 252, 253
See application file for complete search history.

(56) References Cited

U.S. PATENT DOCUMENTS

| | | | | |
|---|---|---|---|---|
| 5,611,023 A * | 3/1997 | Hanyu | ............................ | 358/1.9 |
| 5,774,570 A * | 6/1998 | Toju et al. | ...................... | 382/112 |
| 6,681,395 B1 * | 1/2004 | Nishi | .............................. | 725/45 |
| 7,058,937 B2 * | 6/2006 | Fu et al. | ......................... | 717/161 |
| 7,343,549 B2 | 3/2008 | Ohashi et al. | | |
| 7,386,603 B2 | 6/2008 | Shiba et al. | | |
| 7,665,105 B2 * | 2/2010 | Evans | ............................ | 725/32 |
| 7,698,719 B2 * | 4/2010 | Evans et al. | ...................... | 725/32 |
| 7,707,081 B2 * | 4/2010 | Evans et al. | ..................... | 705/32 |
| 7,774,715 B1 * | 8/2010 | Evans | ........................... | 715/788 |
| 7,890,873 B2 * | 2/2011 | Evans | ........................... | 715/747 |
| 2002/0036654 A1 * | 3/2002 | Evans et al. | ................... | 345/744 |

(Continued)

FOREIGN PATENT DOCUMENTS

JP    2002-229986    8/2002

(Continued)

OTHER PUBLICATIONS

PCT International Search Report in corresponding International Application No. PCT/JP2007/051223, dated Apr. 25, 2007, "first sheet" and "second sheet" (i.e., pp. 1 and 2).

(Continued)

*Primary Examiner* — Doug Hutton, Jr.
*Assistant Examiner* — Andrew Dyer
(74) *Attorney, Agent, or Firm* — Fitzpatrick, Cella, Harper & Scinto

(57) ABSTRACT

There is disclosed, as an example, an output information generation method in an information processor capable of synthesizing multiple data in insertion areas defined in form information to generate output information, the method comprising: a registration step of registering multiple data with priorities and multiple form information having form information corresponding to the respective priorities in a storage unit; a direction step of directing generation of output information by specifying any of the multiple data and any of the form information stored in the storage unit and directing generation of output information; and a generation step of selecting form information corresponding to the priority of each of the data specified by the direction step and synthesizing the multiple data into the insertion areas in the selected form information to generate output information.

3 Claims, 33 Drawing Sheets

U.S. PATENT DOCUMENTS

| | | | |
|---|---|---|---|
| 2002/0165937 A1* | 11/2002 | Nitta et al. | 709/217 |
| 2003/0040926 A1* | 2/2003 | Milton | 705/1 |
| 2003/0084055 A1* | 5/2003 | Tanaka | 707/100 |
| 2003/0196197 A1* | 10/2003 | Fu et al. | 717/161 |
| 2004/0078759 A1 | 4/2004 | Ohashi et al. | 715/517 |
| 2004/0187079 A1* | 9/2004 | Yamada et al. | 715/517 |
| 2005/0002061 A1* | 1/2005 | Uchida et al. | 358/1.18 |
| 2006/0031762 A1* | 2/2006 | Takashima | 715/517 |

FOREIGN PATENT DOCUMENTS

| | | |
|---|---|---|
| JP | 2002229986 A | 8/2002 |
| JP | 2003016356 A | 1/2003 |
| JP | 2004-118353 | 4/2004 |
| JP | 2004118353 A | 4/2004 |
| JP | 2004152152 A | 5/2004 |
| JP | 2005-122307 | 5/2005 |

OTHER PUBLICATIONS

Written Opinion of the International Searching Authority in corresponding International Application No. PCT/JP2007/051223, dated Apr. 25, 2007, "cover sheet", "Box No. I", "Box No. V" and "Box No. VII" (i.e., pp. 1 to 4).

* cited by examiner

FIG. 4
PRIORITY OF ARTICLE MASTER
PRIORITY
| | | |
|---|---|---|
| ixx3200  | MEDIUM → HIGH | |
| Lxx-1910  | MEDIUM → HIGH | NEW PRODUCT/ CAMPAIGN |
| ixx3100  | MEDIUM |  |
| Lxx-950  | MEDIUM | |
| ixx6800  | MEDIUM → LOW | |
| ixx3220  | MEDIUM → LOW | OUT OF STOCK/ END STAGE OF MODEL |
| ixx3220N  | MEDIUM → LOW | |
| ixx6800N  | MEDIUM → LOW | |

FIG. 7
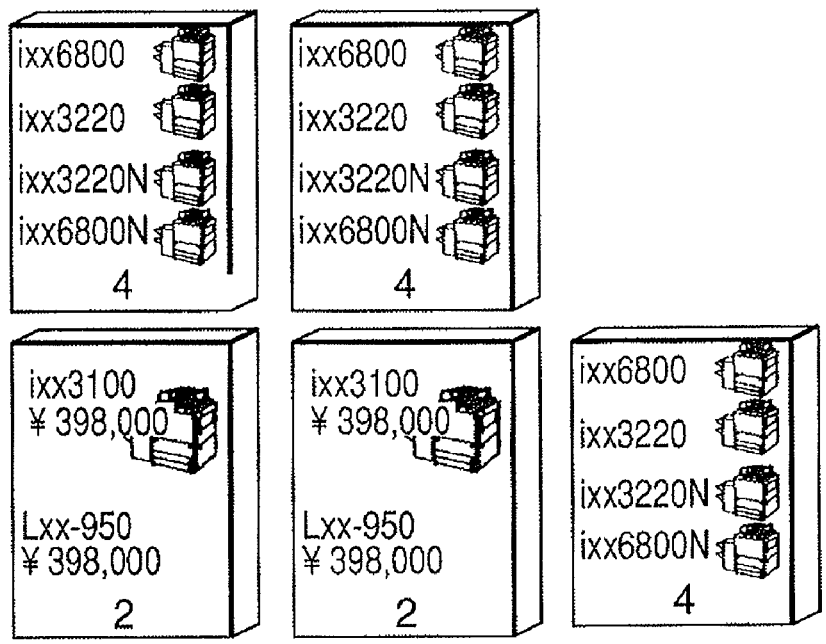
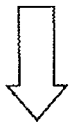
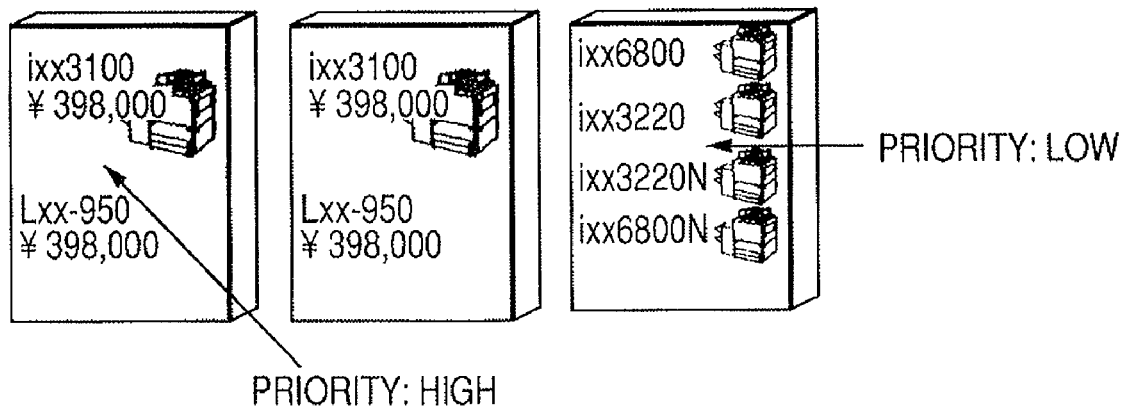

| CONTENT ID | FILENAME | PUBLICATION FLG | REGISTRATION DATE | DELETION FLG |
|---|---|---|---|---|
| 1 | IMAGE 1.jpg | 1 | 2004/11/24 | 0 |
| 2 | IMAGE 2.jpg | 1 | 2004/11/24 | 0 |
| 3 | IMAGE 3.jpg | 1 | 2004/11/24 | 0 |
| 4 | IMAGE 4.jpg | 1 | 2004/11/24 | 0 |
| 5 | IMAGE 5.jpg | 1 | 2004/11/25 | 0 |
| 6 | IMAGE 6.jpg | 1 | 2004/11/25 | 0 |

402

| DATA ID | CONTENT ID | CONTENT CLASSIFICATION ID | REGISTRATION DATE |
|---|---|---|---|
| 1 | 1 | 1 | 2004/11/24 |
| 2 | 2 | 1 | 2004/11/24 |
| 3 | 3 | 1 | 2004/11/24 |
| 4 | 4 | 1 | 2004/11/24 |
| 5 | 5 | 1 | 2004/11/25 |
| 6 | 6 | 1 | 2004/11/25 |

403

| CONTENT CLASSIFICATION ID | CONTENT CLASSIFICATION NAME |
|---|---|
| 1 | ARTICLE IMAGE |

404

| DATA ID | CATEGORY ID | PRIORITY | PUBLICATION FLG | REGISTRATION DATE | DELETION FLG |
|---|---|---|---|---|---|
| 1 | 1 | 1 | 1 | 2004/11/24 | 0 |
| 2 | 1 | 2 | 1 | 2004/11/24 | 0 |
| 3 | 1 | 3 | 1 | 2004/11/24 | 0 |
| 4 | 2 | 3 | 1 | 2004/11/24 | 0 |
| 5 | 2 | 3 | 1 | 2004/11/25 | 0 |
| 6 | 3 | 3 | 1 | 2004/11/25 | 0 |

407

| CATEGORY ID | CATEGORY NAME |
|---|---|
| 1 | INK JET PRINTER |
| 2 | LASER BEAM PRINTER |
| 3 | DIGITAL CAMERA |

| DATA ID | DATA ITEM ID | DATA ITEM VALUE |
|---|---|---|
| 1 | 1 | Printer1 |
| 1 | 2 | 10000 |
| 1 | 3 | 2005 MODEL |
| 2 | 1 | Printer2 |
| 2 | 2 | 20000 |
| 2 | 3 | 2005 MODEL |
| 3 | 1 | Printer3 |
| 3 | 2 | 30000 |
| 3 | 3 | 2005 MODEL |
| 4 | 1 | Printer4 |
| 4 | 2 | 40000 |
| 4 | 3 | COLOR PRINTER |
| 5 | 1 | Printer5 |
| 5 | 2 | 50000 |
| 5 | 3 | COLOR PRINTER |
| 6 | 1 | Printer6 |
| 6 | 2 | 60000 |
| 6 | 3 | COLOR PRINTER |

406

| DATA ITEM ID | DATA ITEM NAME |
|---|---|
| 1 | ARTICLE NAME |
| 2 | PRICE |
| 3 | COMMENT |

| OUTPUT ID | FILENAME | TEMPLATE NAME |
|---|---|---|
| 1 | Template. fcx | PRINTER CATALOG |

409

| OUTPUT ID | TEMPLATE ID | FILENAME | PRIORITY | THE NUMBER OF INSERTION AREA |
|---|---|---|---|---|
| 1 | 1 | Template1. fcp | 1 | 1 |
| 1 | 2 | Template2. fcp | 2 | 2 |
| 1 | 3 | Template3. fcp | 3 | 4 |

410

| ORDER NUMBER | TEMPLATE ID | OUTPUT DATA | ATTRIBUTE |
|---|---|---|---|
| 1 | 1 | 1 | TEXT |
| 2 | 1 | 2 | TEXT |
| 3 | 1 | 1 | IMAGE |
| 4 | 1 | 3 | TEXT |
| 1 | 2 | 1 | TEXT |
| 2 | 2 | 2 | TEXT |
| 3 | 2 | 1 | IMAGE |
| 1 | 3 | 1 | TEXT |
| 2 | 3 | 1 | IMAGE |

FIG. 27

[Form Section]  
Form=Template1. fcp   ~2301  
Color=Color

[Body Data Section]   ~2302  
"Printer1", "10000", "IMAGE1. jpg", "2005 MODEL"

[Form Section]  
Form=Template1. fcp  
Color=Color

[Body Data Section]  
"Printer2", "20000", "IMAGE2. jpg", "2005 MODEL"

[Form Section]  
Form=Template2. fcp  
Color=Color

[Body Data Section]  
"Printer3", "30000", "IMAGE3. jpg", "Printer4", "40000", "IMAGE4. jpg"

[Form Section]  
Form=Template3. fcp  
Color=Color

[Body Data Section]  
"Printer5", "IMAGE5. jpg", "Printer6", "IMAGE6. jpg", "Printer7", "IMAGE7. jpg", "Printer8", "IMAGE8. jpg"

FIG. 30

TEMPLATE

| TEMPLATE AREAS: 1 PRIORITY: 1 | TEMPLATE AREAS: 2 PRIORITY: 2 | TEMPLATE AREAS: 4 PRIORITY: 3 |

SPECIFICATION OF THE NUMBER OF PAGES: 3 PAGES

MASTER TO BE INSERTED — PRIORITY  (2601)

| Master | Priority |
|---|---|
| Printer1 | 1 |
| Printer2 | 2 |
| Printer3 | 3 |
| Printer4 | 3 |
| Printer5 | 3 |
| Printer6 | 3 |
| Printer7 | 3 |
| Printer8 | 3 |

2602
PATTERNS ENUMERATED A STEP S601

PATTERN 1 OF TEMPLATES TO BE USED

| TEMPLATE AREAS: 4 PRIORITY: 3 | TEMPLATE AREAS: 4 PRIORITY: 3 |

PATTERN 2 OF TEMPLATES TO BE USED

| TEMPLATE AREAS: 2 PRIORITY: 2 | TEMPLATE AREAS: 2 PRIORITY: 2 | TEMPLATE AREAS: 4 PRIORITY: 3 |

2603
FINAL RESULT

PATTERN OF TEMPLATES TO BE USED

| TEMPLATE AREAS: 2 PRIORITY: 2 | TEMPLATE AREAS: 2 PRIORITY: 2 | TEMPLATE AREAS: 4 PRIORITY: 3 |

MASTER TO BE ACTUALLY INSERTED

| | | |
|---|---|---|
| Printer1  1 | Printer3  3 | Printer5  3 |
| Printer2  2 | Printer4  3 | Printer6  3 |
| | | Printer7  3 |
| | | Printer8  3 |

```
[Form Section]
Form=Template1. fcp
Color=Color

[Body Data Section]
"Printer1", "10000", "IMAGE1. jpg", "2005 MODEL"

[Form Section]
Form=Template1. fcp
Color=Color

[Body Data Section]
"Printer2", "20000", "IMAGE2. jpg", "2005 MODEL"

[Form Section]
Form=Template2. fcp
Color=Black&White              ~ 2801

[Body Data Section]
"Printer3", "30000", "IMAGE3. jpg", "Printer4", "40000", "IMAGE4. jpg"

[Form Section]
Form=Template3. fcp
Color=Black&White              ~ 2802

[Body Data Section]
"Printer5", "IMAGE5. jpg", "Printer6", "IMAGE6. jpg", "Printer7", "IMAGE7. jpg",
"Printer8", "IMAGE8. jpg"
```

FIG. 33

STORAGE MEDIUM SUCH AS FD/CD-ROM

| DIRECTORY INFORMATION |
|---|
| FIRST DATA PROCESSING PROGRAM<br>PROGRAM CODE GROUP CORRESPONDING TO STEPS IN FLOWCHART SHOWN IN FIGURE 9 |
| SECOND DATA PROCESSING PROGRAM<br>PROGRAM CODE GROUP CORRESPONDING TO STEPS IN FLOWCHART SHOWN IN FIGURE 21 |
| THIRD DATA PROCESSING PROGRAM<br>PROGRAM CODE GROUP CORRESPONDING TO STEPS IN FLOWCHART SHOWN IN FIGURE 24 |
| FOURTH DATA PROCESSING PROGRAM<br>PROGRAM CODE GROUP CORRESPONDING TO STEPS IN FLOWCHART SHOWN IN FIGURE 25 |
| FIFTH DATA PROCESSING PROGRAM<br>PROGRAM CODE GROUP CORRESPONDING TO STEPS IN FLOWCHART SHOWN IN FIGURE 29 |
| |

MEMORY MAP OF STORAGE MEDIUM

INFORMATION PROCESSING APPARATUS AND METHOD

TECHNICAL FIELD

The present invention relates to control of an information processor capable of synthesizing multiple data in insertion areas defined in form information to generate output information.

BACKGROUND ART

In conventional systems, it has been possible to easily create an electronic catalog for supporting business by inserting managed master data into an electronic catalog template and generating a catalog.

Japanese Patent Application Laid-Open No. 2005-122307 proposes a technique in which text data to be inserted into form data and form data to be applied to the text data are managed in association with each other with the use of a book ID. In Japanese Patent Application Laid-Open No. 2005-122307, it is assumed that one text data and one form data are associated with each other.

In the above conventional system, however, data to be inserted are uniformly handled, and therefore, recommended articles for active promotion, such as campaign articles, and other articles are equivalently handled. Data are not differentiated from one another as described-above, and therefore, when a catalog of multiple articles matching a user requirement is outputted, all the articles are equivalently handled in the output.

Therefore, a lot of pages are required, and the cost for paper, consumables and the like for color printing is increased. Furthermore, there are problems such as that it is impossible to highlight particular data, such as data of recommended articles.

It is possible to highlight particular articles by outputting each article individually in a different template and manually arranging the printed matters later. However, outputting each article individually in a different template in this way requires a very troublesome work. Recently, it is required to dynamically manage association of data to be inserted on demand and form data with each other.

DISCLOSURE OF THE INVENTION

The present invention has been made to solve at least one of the above problems. The object of the present invention is to provide a mechanism which makes it possible to easily create an output in which high-priority data is highlighted (for example, highlighted with color, the output size or the like), reducing the cost, without doing a troublesome work as conventionally done.

The present invention is an information processor capable of synthesizing multiple data in insertion areas defined in form information to generate output information, comprising:

storage-means for storing and managing multiple data with priorities and multiple form information including form information corresponding to the respective priorities;

direction means for directing generation of output information by specifying any of the multiple data and any of said form information stored in said storage means and directing generation of output information; and generation means for selecting form information corresponding to the priority of each of the data specified by said direction means and synthesizing said multiple data into the insertion areas in the selected form information to generate output information.

Other features and advantageous of the present invention will be apparent from the following description taken in conjunction with the accompanying drawings, in which like reference characters designate the same or similar parts throughout there of.

BRIEF DESCRIPTION OF THE DRAWINGS

FIG. 4 is a schematic diagram illustrating the outline of outputting a catalog by an output system of the present invention;

FIG. 7 is a schematic diagram illustrating the outline of outputting a catalog by an output system of the present invention;

FIG. 17A is a diagram showing an example of the content of a database 108 at the time when article master registration, image registration and association end;

FIG. 17B is a diagram showing an example of the content of the database 108 at the time when article master registration, image registration and association end;

FIG. 20 is a diagram showing an example of the content of the database 108 at the time when template registration ends;

FIG. 27 is a diagram showing an example of a data file for insertion in the case where final result 2203 shown in FIG. 26 is obtained;

FIG. 30 is a diagram showing the image of masters to be inserted and templates at the time when catalog insertion determination processing giving preference to the number of pages shown in FIG. 29 is performed;

FIG. 31 is a diagram showing an example of the image of a catalog generated at S406 in FIG. 24 based on a data file for insertion which is finally generated finally by the catalog insertion determination processing giving preference to the number of pages shown in FIG. 29;

FIG. 32 is a diagram showing an example of the result of performing black-and-white conversion processing at step S405 in FIG. 24 for the data file for insertion in FIG. 27; and FIG. 33 is a diagram illustrating the memory map of a storage medium (a recording medium) storing various data processing programs which can be read by a server apparatus constituting a system according to the present invention.

BEST MODE FOR CARRYING OUT THE INVENTION

An embodiment of an apparatus according to the present invention will be described below with reference to FIGS. 1 to 33.

Figure 1:
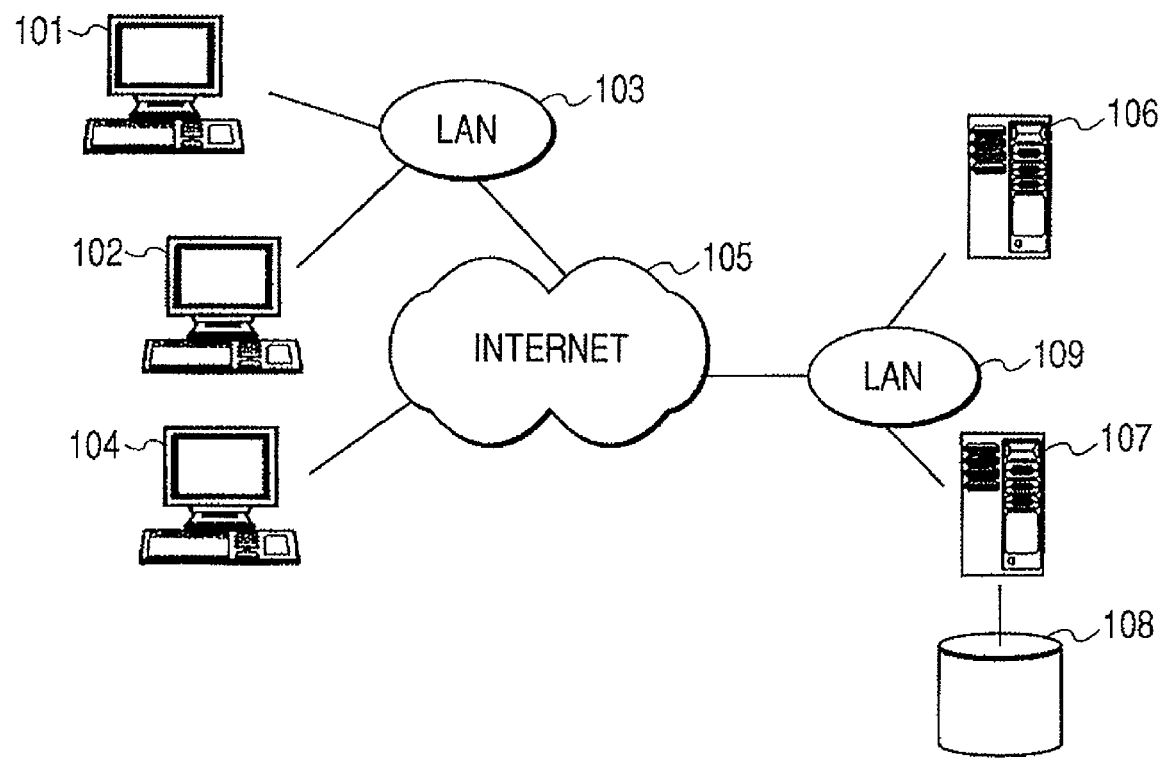
FIG. 1 is a system configuration diagram showing an example of the configuration of a data insertion system according to the present invention.

FIG. 1 is a system configuration diagram showing an example of the configuration of a data insertion system according to the present invention.

In FIG. 1, reference numerals 101, 102 and 104 denote client PC's. The client PC's 101, 102 and 104 are for a system administrator to register a new data file or perform system maintenance processing such as modification of user management information or for a user to direct search for an article, output of article information and the like.

Reference numerals 103 and 109 denote local area networks (LAN's), and equipment connected to the networks exchange data with other equipment via the LAN's. Reference numeral 105 denotes the Internet, and the client PC 104 is a client PC directly connected to the Internet 105. Though the client PC 104 is different from the client PC's 101 and 102 in the connection form, they are used for the same purpose.

Reference numeral 106 denotes an HTTP server, which receives a request sent by the HTTP protocol from the client PC via the network. Reference numeral 107 denotes a Web application server. Some Web application servers are registered with the HTTP server 106, and the HTTP server 106 allocates processing to a suitable Web application server in accordance with the content of a request from the client PC 101, 102 or 104.

Receiving a request, the Web application server 107 executes processing and returns the result of the processing to the client.

Reference numeral 108 denotes a database, in which content data information such as catalog data and image data, text information such as article information and system information such as user/group information and processing information about registered data files are recorded.

As described above, the HTTP server 106, the Web application server 107 and the database 108 are organically combined to function as a Web database system.

Figure 2:
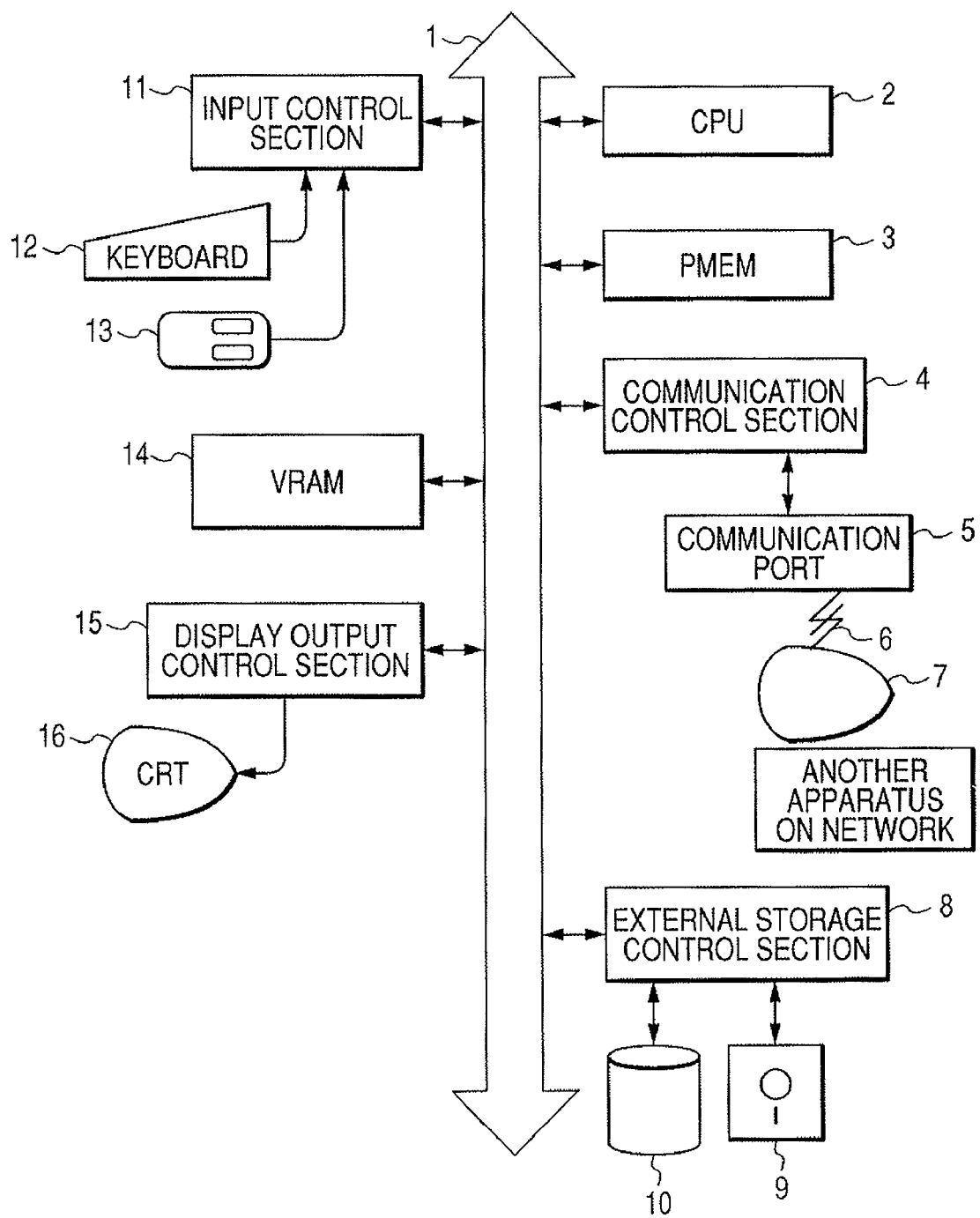
FIG. 2 is a block diagram showing an example of the configuration of an apparatus according to the present invention.

FIG. 2 is a block diagram showing an example of the configuration of the apparatus according to the present invention (that is, the client PC's 101, 102 and 104, the HTTP server 106 and the Web application server 107 shown in FIG. 1).

In FIG. 2, reference numeral 1 denotes a system bus, and each of component blocks to be described below is connected to this system bus. Reference numeral 2 denotes a CPU (central processing unit). Reference numeral 3 denotes a program memory (referred to as a PMEM). The CPU 2 selects a program for the processing of this embodiment from a hard disk 10 as appropriate, reads it to the PMEM 3 and executes it. Data inputted from a keyboard 12 is stored in the PMEM 3, which is also a text memory, as code information.

Reference numeral 4 denotes a communication control section, which performs control of input/output data at a communication port 5. A signal outputted from the communication port 5 is communicated to the communication port of another apparatus 7 on the network via a communication line 6.

Though description is made on a network such as a LAN in this embodiment, it goes without saying that the present invention is applicable even if the communication port and the communication line to be connected to the communication control section 4 are a general public line.

Reference numeral 8 denotes an external storage device control section, which controls input/output of data to/from a hard disk (referred to as an HD) 9 and a floppy (registered trademark) disk (referred to as an FD) 10.

Reference numeral 11 denotes an input control section, to which input devices such as a keyboard 12 and a mouse 13 are connected. An operator directs operation of the system and the like by operating this keyboard 12. The mouse 13 is a pointing device (referred to as a PD) for directing processing of image information on the monitor such as a CRT 16. Though a mouse is used in this embodiment, other PD's may be used. The cursor on the CRT 16 is arbitrarily moved in the X or Y direction with this PD such as the mouse 13 to select a command icon on a command menu to direct processing as well as to specify a target to be edited, a rendering position and the like.

Reference numeral 14 denotes a video image memory (referred to as a VRAM). Reference numeral 15 denotes a display output control section, and reference numeral 16 denotes a CRT. Data displayed on the monitor such as the CRT 16 is developed on the VRAM 14 as bitmap data.

The program of the present invention may be stored in a ROM or in a storage medium, such as an HD or an FD, directly connected to the apparatus. Furthermore, it may be stored in another apparatus connected to the network. The program of the present invention can be supplied to a system or an apparatus via a storage medium, such as an FD and an HD, or a network.

Figure 3:
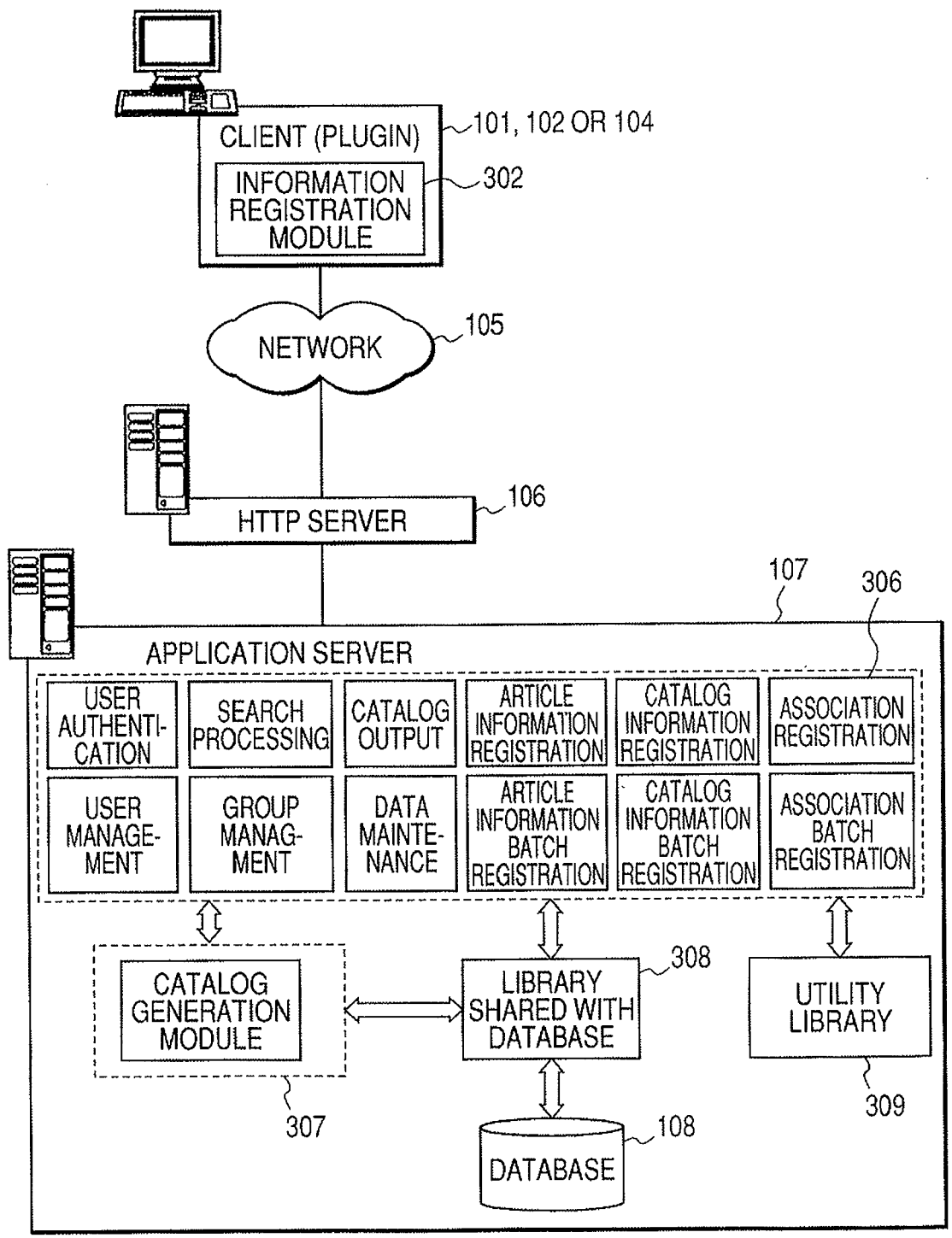
FIG. 3 is a block diagram illustrating the module configuration of a program according to the present invention.

FIG. 3 is a block diagram illustrating the module configuration of the program according to the present invention, and the same reference numerals are given to the same components as in FIG. 1.

In FIG. 3, in the client PC's 101, 102 and 104, a module 302 for registering data files, such as catalog information, image data and catalog templates, with the Web application server 107 or generating a catalog is stored. In this embodiment, however, this module 302 is automatically delivered from the server 107 by the plug-in of a Web browser as necessary, and therefore, it is not necessary to perform installation processing on the client PC. It is also possible to install this module 302 in the PC's 101, 102 and 104.

In the Web application server 107, a module 306 for processing a request from the client PC which has been received from the HTTP server 106 is stored (installed). The functions corresponding to the module 306 includes user authentication, search processing, various data batch registration, article information output and data maintenance functions and the like. The module 306 is loaded on the memory by the CPU in response to a request from the client to execute processing.

Furthermore, in the Web application server 107, there is stored (installed) a catalog generation module 307 for generating a catalog based on catalog templates and information to be inserted into catalog, separately from the module 306. Furthermore, in the Web application server 107, there are stored (installed) a library 308 for exchanging data with the database 108 and various utility libraries 309.

First, the outline of outputting a catalog with an output system of the present invention will be described with reference to FIGS. 4 to 7.

FIGS. 4 to 7 are schematic diagrams illustrating the outline of outputting a catalog by the output system of the present invention.

First, as shown in FIG. 4, an administrator or the like registers priority information about each article master data with the database 108. In this case, the administrator or the like raises the priority of an article to be recommended to consumers and lowers the priority of an article which is not to be positively sold.

Figure 5:
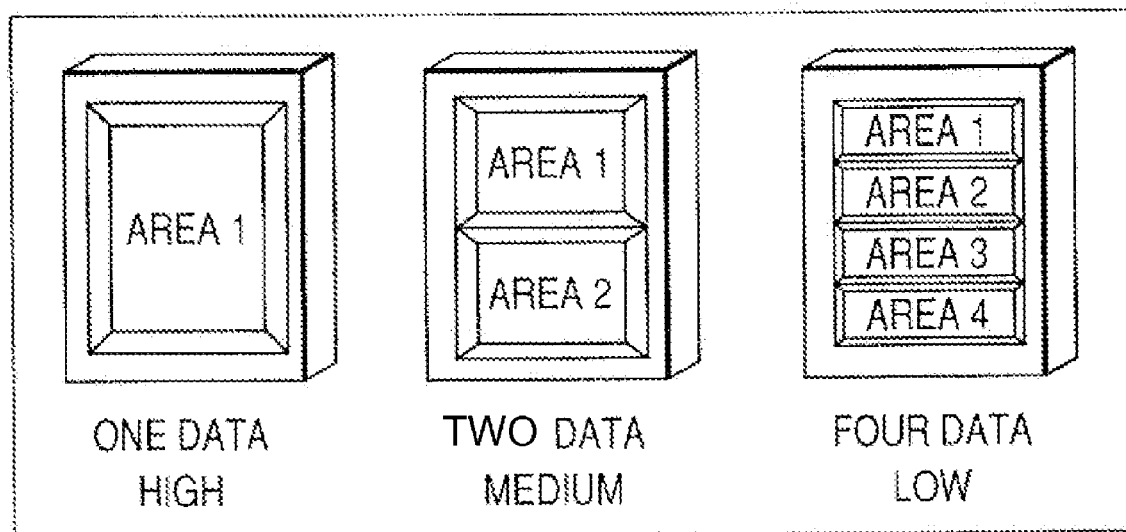
FIG. 5 is a schematic diagram illustrating the outline of outputting a catalog by an output system of the present invention.

Furthermore, as shown in FIG. 5, the administrator or the like creates templates (form information) according to priorities and registers them with the database. Within the area of the template corresponding to each priority, one or more insertion areas are arbitrarily defined. In this case, the amount of information to be inserted can be also controlled by definition.

After that, a user selects article master data and templates from the client PC. Furthermore, the user selects an output method (output giving preference to priority/output giving preference to the number of pages) and sends an output direction to the Web application server 107 (hereinafter referred to as the server 107). In response to this one output direction, the server 107 performs control so that insertion output of a catalog (synthesis of article data in an insertion area of a template) is performed while switching of templates is automatically performed for each page to be generated according to the priority of article master data. It is assumed that the article master data is to be inserted from the top in order of priority.

Figure 6:
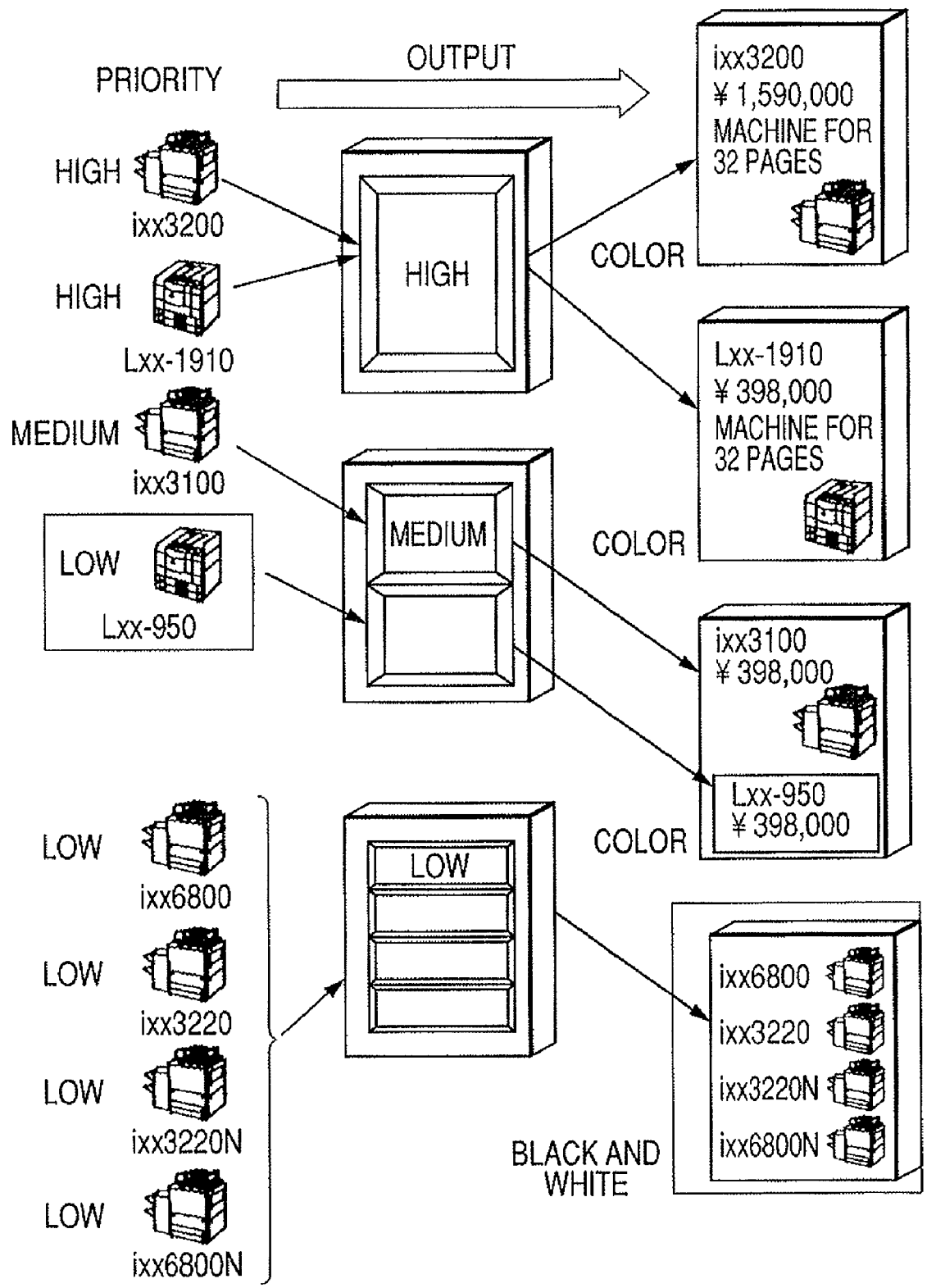
FIG. 6 is a schematic diagram illustrating the outline of outputting a catalog by an output system of the present invention.

First, in the case of the output giving preference to priority, the output is performed, for example, as shown in FIG. 6. Even in the case of master data with lower priority, insertion output of the master data into a template with higher priority is performed if there is a space (that is, an insertion area in which article data is not synthesized) on the previous page. Furthermore, in the case of the output giving preference to priority, it is possible to specify priority and set that data with priority below the priority is to be outputted in black and white.

On the other hand, in the case of the output giving preference to the number of pages, the output is performed, for example, as shown in FIG. 7. In this case, the server 107 enumerates such combinations that the number of pages can be within the specified number of pages and performs control so that output is performed with the use of a combination with the number of pages nearest to the number of pages desired by the user in which a lot of templates with high priority are included.

As described above, it is possible to easily create a catalog for business information and the like in which recommended articles with high priority are highlighted (highlighted with color, the output size or the like), reducing the cost by partially performing black-and-white output, reducing the number of pages and the like.

Detailed description will be made below with reference to FIGS. 8 to 32.

Figure 8:
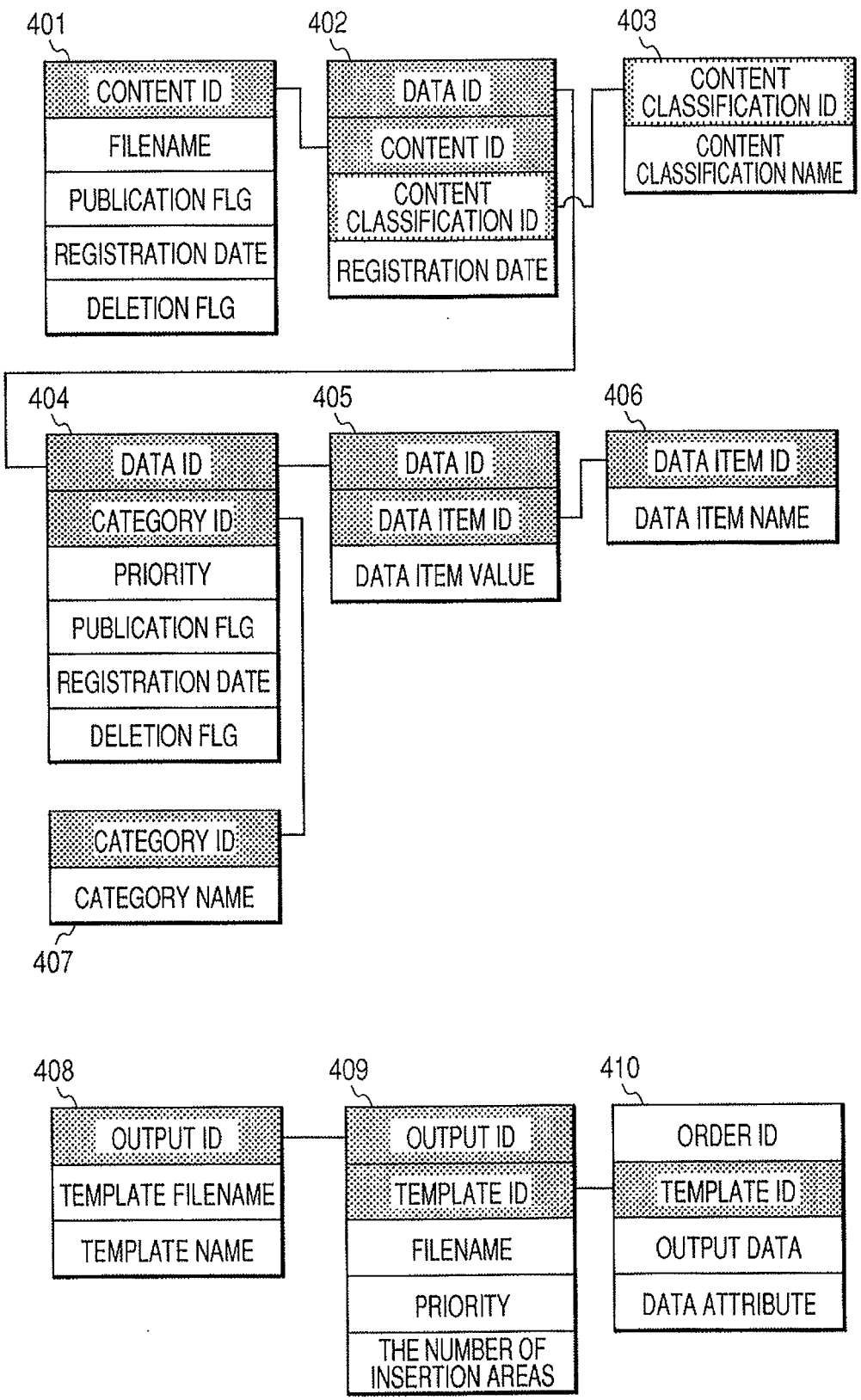
FIG. 8 is a table configuration diagram showing an example of tables of a database in the present invention.

FIG. 8 is a table configuration diagram showing an example of tables of the database in the present invention. Specific examples of tables 401 to 407 described below are shown in FIGS. 17A and 17B to be described later.

In FIG. 8, reference numeral 404 denotes a data table, which manages text information such as article master information. The data table 404 stores data ID's, category ID's, registration dates, update dates (not shown), publication flags, deletion flags, priorities and the like. The data ID is uniquely determined for each data.

The publication flag is information for controlling whether this data is published on the Web. The deletion flag is information for controlling whether the data is deleted information. The priority is information for determining the priority of the article at the time when a catalog is outputted. The category ID is for managing which category this data belongs to, and it is associated with a category management table 407 described later.

The category management table 407 stores the category ID's, category names and the like. A data item value table 405 stores data ID's, data item ID's and data item values and shows values of data of items belonging to the data table 404.

Reference numeral 406 denotes a data definition item table, which is associated with the data item value table 405 via the data item ID's, and it manages the data item names of the data item value table 405. As the data item names of the data definition item table 406, for example, article information item names, such as article name and price, are managed.

Reference numeral 401 denotes a content table, which manages information such as an image file to be inserted into a catalog. Similar to the data table 404, the content table 401 stores content ID's uniquely determined for each content, registration dates, update dates (not shown), publication flags, deletion flags and the like.

Reference numeral 402 denotes a data/content management table, which is a table for associating a content file managed by the content table 401 and text information managed by the data table 404 with each other. The data/content management table 402 stores data ID's, the content ID's, content classification ID's and registration dates.

A content classification management table 403 stores the content classification ID's and content classification names, and it is associated with the data/content management table 402 via the content classification ID's. In this content classification management table 403, what the classification for association in the data/content management table 402 is (for example, image of article) is managed. The content classification management table 403 stores the content classification ID's and content classification names.

Specific examples of tables 408 to 410 described next will be shown in FIG. 20 to be described later.

Figure 18:
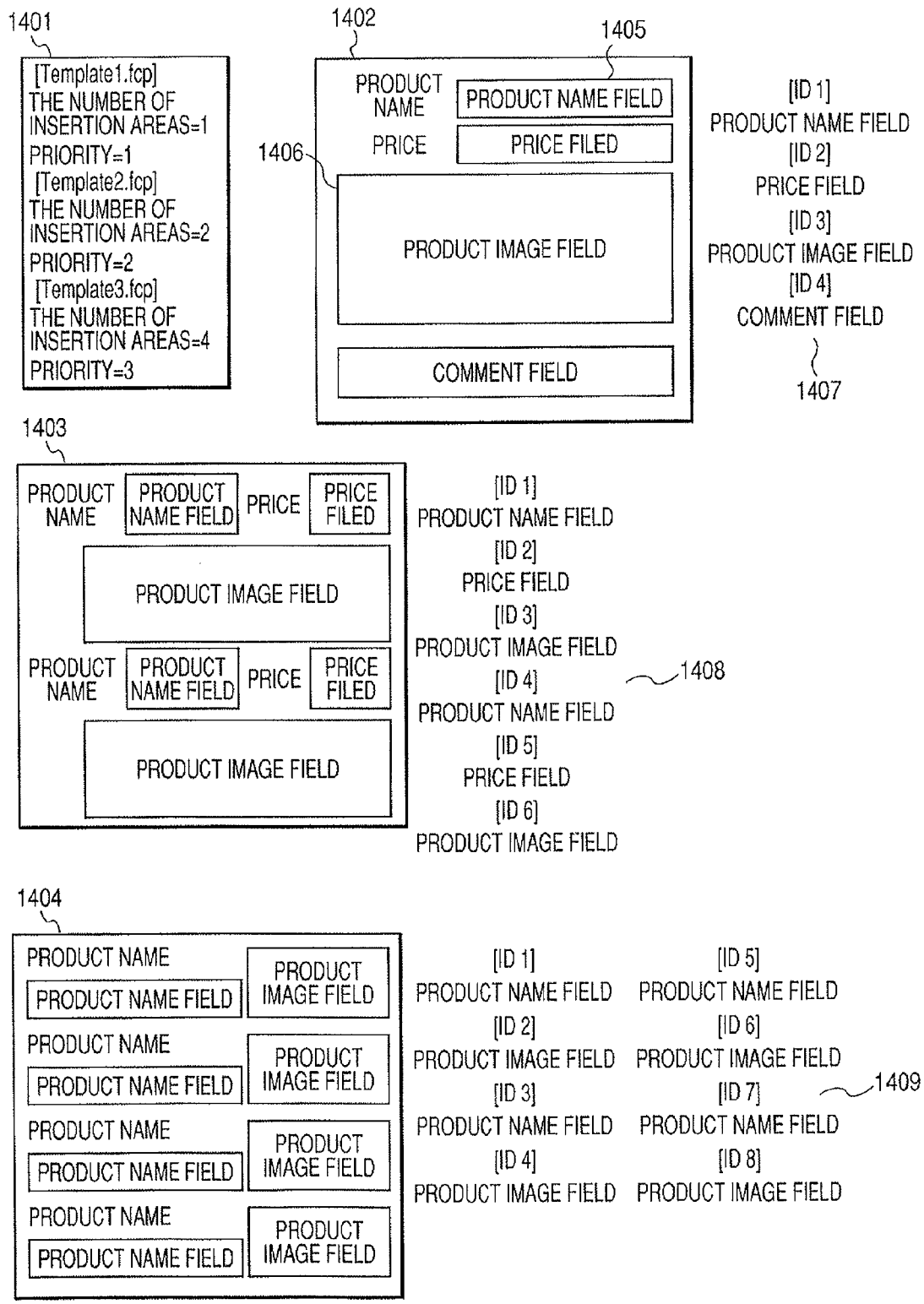
FIG. 18 is a diagram showing an example of an output catalog template of the present invention.

Reference numeral 408 denotes an output table, which manages templates of a catalog to be outputted. The items of this output table 408 include output ID by which output is uniquely determined, template filename to be used by the output, and template name to be displayed to a user when an output template is selected. In a template file corresponding to the template filename, filenames of templates for respective priorities are described, and a specific example is shown in FIG. 18 to be described later.

Reference numeral 409 denotes a compound definition table, which manages a template for each priority, for each output ID. As the items of this compound definition table 409, template ID, filename, priority and the number of insertion areas are stored. The template ID is an ID for uniquely determining each of template files in order of priority, and it is included in an output template. The filename corresponds to the filename corresponding to each priority, which is described in the template filename field in the output table 408. As the priority, the priority of the template is stored. As the number of insertion areas, information is stored about how many areas into which master data are to be inserted exist in the template.

Reference numeral 410 is an item definition table, which is associated with the compound definition table 409 via the template ID's and which manages which data are to be outputted into the insertion areas of the template. The items of the item definition table 410 includes order ID, template ID, output data and data attribute. The order ID is for uniquely determining an insertion area in the template. The output data indicates which item in master data the data to be outputted into an insertion area in the template is. Furthermore, the data attribute is for indicates the content classification (text, image or the like) of content associated with the master.

Processing for registering master data with priority, image data, templates with priority of the present invention will be described below with reference to FIGS. 9 to 20.

Figure 9:
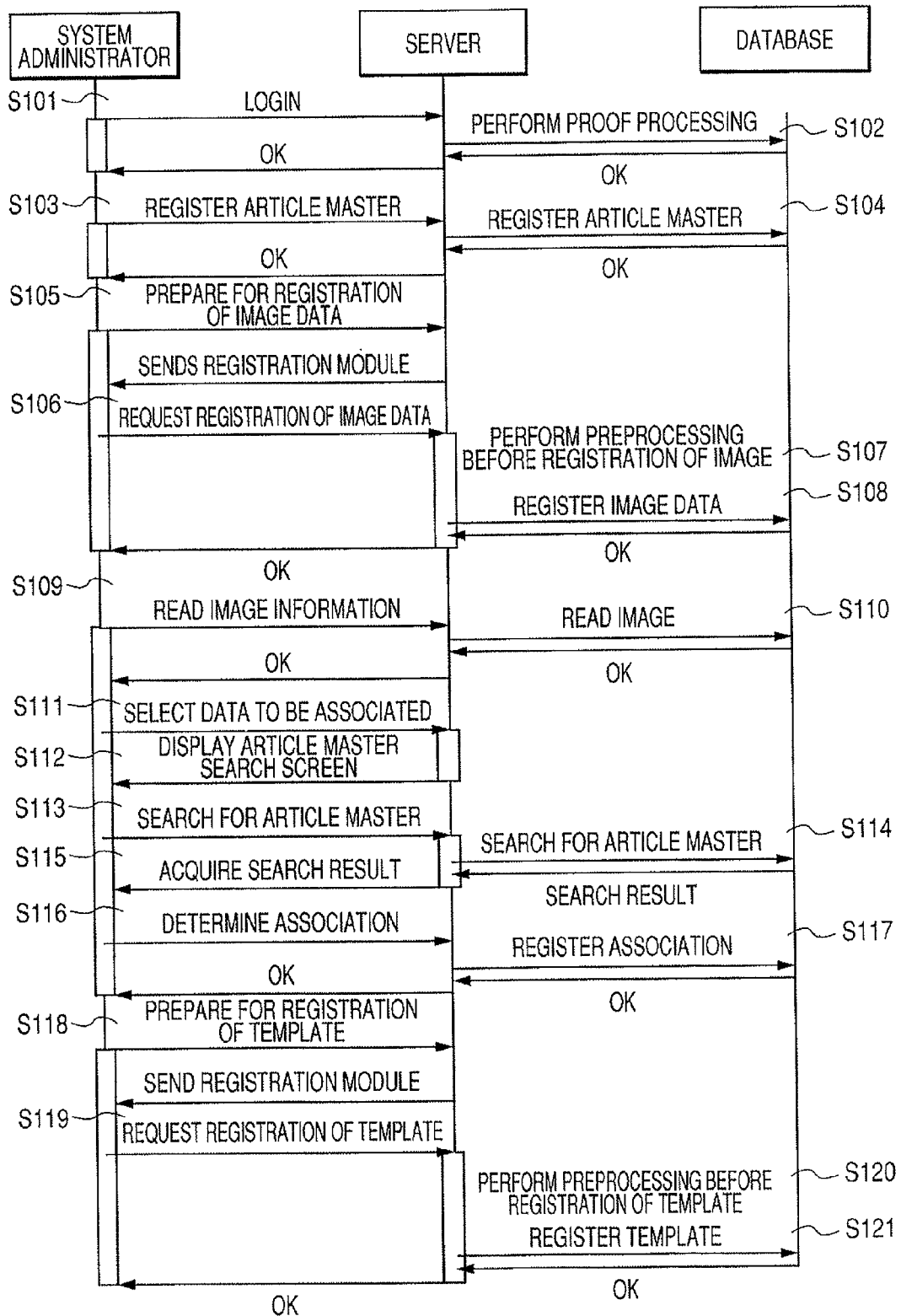
FIG. 9 is a flowchart showing an example of a first control procedure in the present invention.

FIG. 9 is a flowchart showing an example of a first control procedure in the present invention, which corresponds to the master data/image/template registration processing of the present invention. In the Figure, S101, S103, S105, S106, S109, S111, S112, S113, S115, S116, S118 and S119 correspond to operations or processings performed by the client PC 101, 102 or 104 (hereinafter referred to as the client PC). The operations or processings correspond to operations performed by a user from the client PC 101, 102 or 104 (hereinafter referred to as the client PC) and the processings of the client PC. The operations and processings are realized with the use of a module to be executed on the Web browser by the CPU of the client PC (such as a module received from the server 107). In the figure, S102, S104, S107, S110, S114, S117, S120 and S121 are realized with the use of a module 306 to be executed on the memory by the CPU of the Web application server 107 (hereinafter referred to as the server 107).

First, at step S101, a system administrator executes login processing from the client PC with an account and a password. In this case, any authentication method may be used in addition to the use of the account and the password. In this login processing, a module executed on the Web browser by the CPU of the client PC (hereinafter referred to as a module) sends a login request including information about the inputted account and password to the server 107.

Receiving this request, at step S102 the module 306 of the server 107 inquires of the database 108 about whether master data registration processing and image registration processing are permitted for the inputted account and password and performs authentication processing. Here, in the case of an account for which execution of the above processings is not permitted, the module 306 of the server 107 sends an error screen to the client PC.

On the other hand, in the case of such an account for which execution is permitted, the module 306 of the server 107 sends a function list screen (module) for system administrator to the client PC. The function list screen will be described below.

Figure 10:
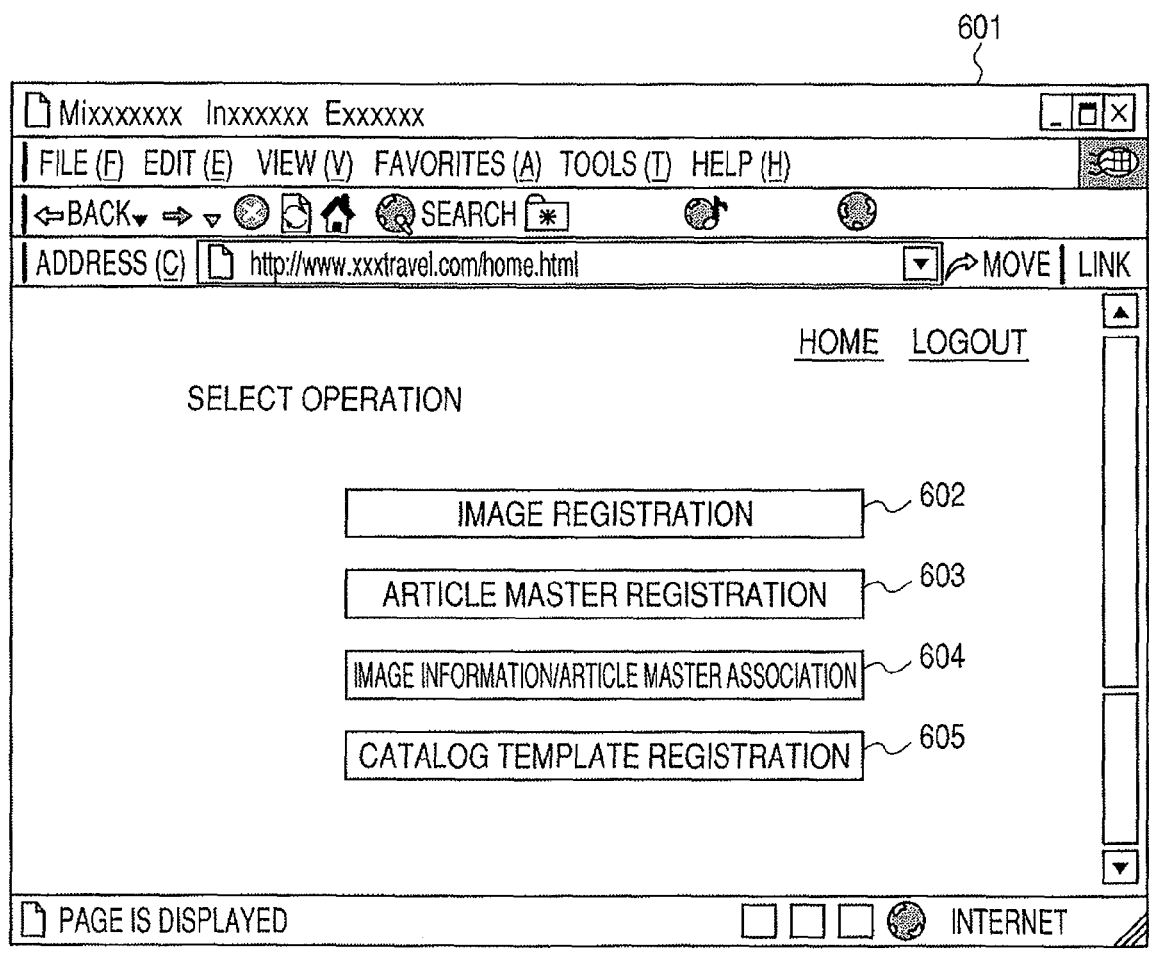
FIG. 10 is a diagram showing an example of a function list screen of the present invention.

FIG. 10 is a diagram showing an example of the function list screen of the present invention. This screen is displayed by a module sent from the server 107 to the browser of the client PC.

In FIG. 10, reference numeral 601 denotes the function list screen. Reference numeral 602 denotes an image registration button, which is for selecting image data to be registered with the server and executing registration processing. Reference numeral 603 is an article master registration button, which is for registering the master data of each article with the server. Reference numeral 604 denotes an image information/article master association button, which is for associating each image data and each article master registered with the server, with each other. Reference numeral 605 is a catalog template registration button, which is for registering a template for outputting a catalog.

At step S103 in FIG. 9, the user performs an operation of registering an article master. First, by the user specifying the article master registration button 603, the browser of the client PC performs control to display the article master registration screen shown in FIG. 11 on the monitor. The article master registration screen will be described below.

Figure 11:
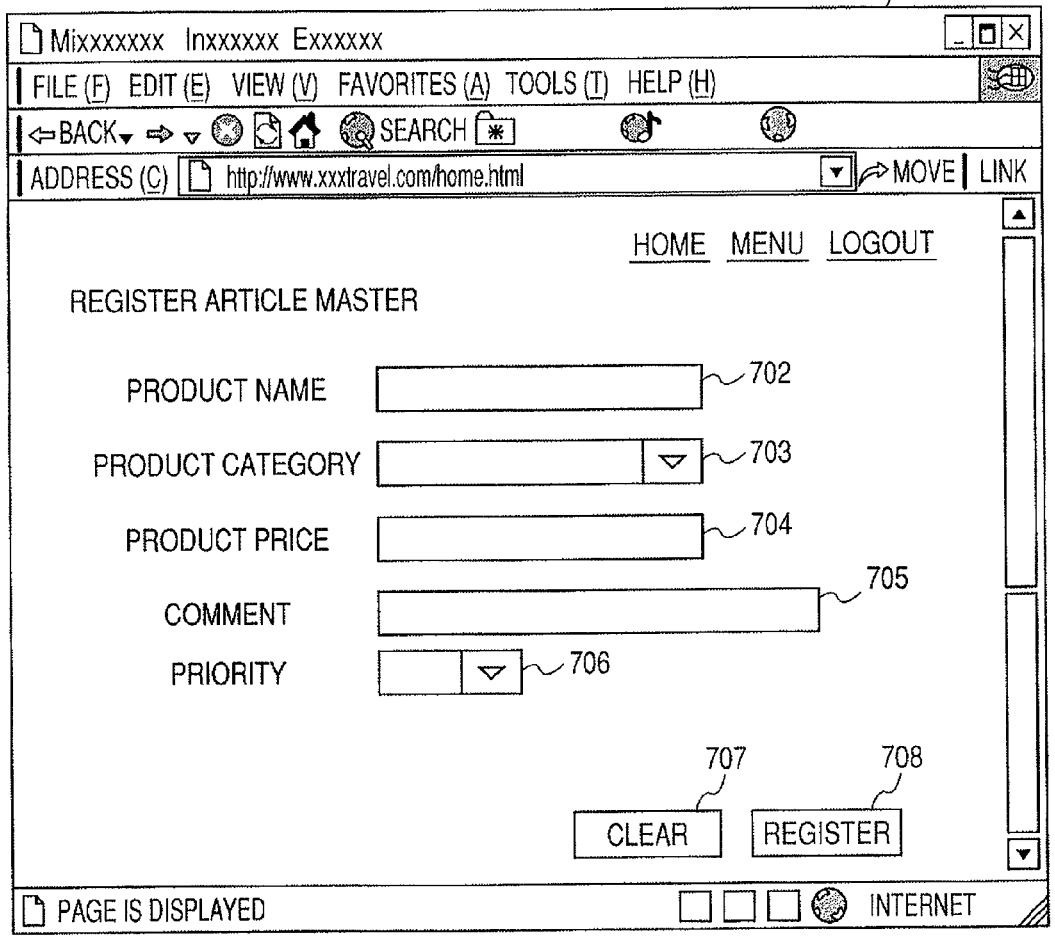
FIG. 11 is a diagram showing an example of a screen for registering an article master of the present invention.

FIG. 11 is a diagram showing an example of the screen for registering an article master of the present invention. This screen is displayed by a module sent from the server 107 to the browser of the client PC.

In FIG. 11, reference numeral 701 denotes a screen for setting an article master. Reference numerals 702 to 706 denote setting items registered with the database 108.

On this screen, it is possible to input an article name 702, an article category 703, an article price 704, other comment information 705, priority information 706 used when master data to be registered is outputted.

Reference numeral 707 denotes a clear button. When this button is selected with a PD such as a mouse, all inputted information is cleared. Reference numeral 708 denotes a register button. When this button is selected with a PD such as a mouse, inputted article master information is sent to the server 107 by the module on the client PC and registered with the data table 404 of the database 108. Then, the screen returns to the function list screen 601 in FIG. 10.

Receiving an article master registration request from the client PC, the module 306 of the server 107 registers an article master with the database 108 at step S104 in FIG. 9. If the registration with the database 108 normally ends, then the module 306 of the server 107 sends a screen notifying the normal end to the client PC. By the above processing, the registration of article master data with a priority with the database 108 is completed. An example of registration of article master data is shown in tables 404 to 407 in FIGS. 17A and 17B which are to be described later. Here, if the registration with the database 108 fails, then the module 306 of the server 107 sends an error screen to the client PC.

Next, at step S105 in FIG. 9, the user performs an operation of preparing for registration of image data. By the user specifying the image registration button 602, the module on the client PC prepares for registration of image data for the server at step S105 in FIG. 9. In response to this, the module 306 of the server 107 sends a file registration module to the client PC. In this case, if the file registration module already exists on the client PC, the module is not sent.

Figure 12:
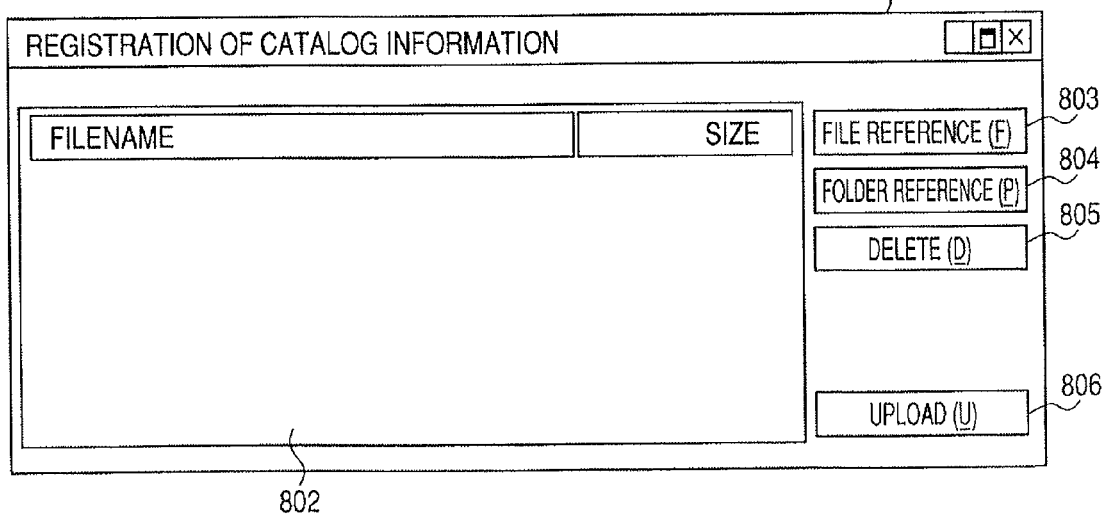
FIG. 12 is a diagram showing an example of an image data registration screen of the present invention.

Then, the Web browser of the client PC executes the file registration module and performs control to display the image data registration screen shown in FIG. 12 on the monitor. The image data registration screen will be described below.

FIG. 12 is a diagram showing an example of the image data registration screen of the present invention, which corresponds to a screen for selecting image data to be registered. This screen is displayed by the file registration module sent from the server to the browser of the client PC.

In FIG. 12, reference numeral 801 denotes the file registration screen for registering image data. In an area 802, a list of files to be registered with the server is displayed.

Reference numeral 803 denotes a button for displaying a file reference screen for selecting a file to be registered. When this button is selected with a PD such as a mouse, a screen for referring to a file is displayed. When files are selected and executed, all the selected files are displayed on the file list 802.

Reference numeral 804 denotes a folder reference button. When this button is selected with a PD such as a mouse, a screen for referring to a folder is displayed. When a folder is selected and executed, all files included in the selected folder are displayed in the file list 802.

Reference numeral 805 denotes a delete button. By selecting a file to be deleted from the file list 802 and selecting this button with a PD such as a mouse, the file can be deleted from the list of files to be registered.

Reference numeral 806 is an upload button for performing registration processing of all the files displayed in the file list 802 with the server 107. When this button is selected with a PD such as a mouse, the file registration module on the client PC displays the registration confirmation screen shown in FIG. 13.

Figure 13:
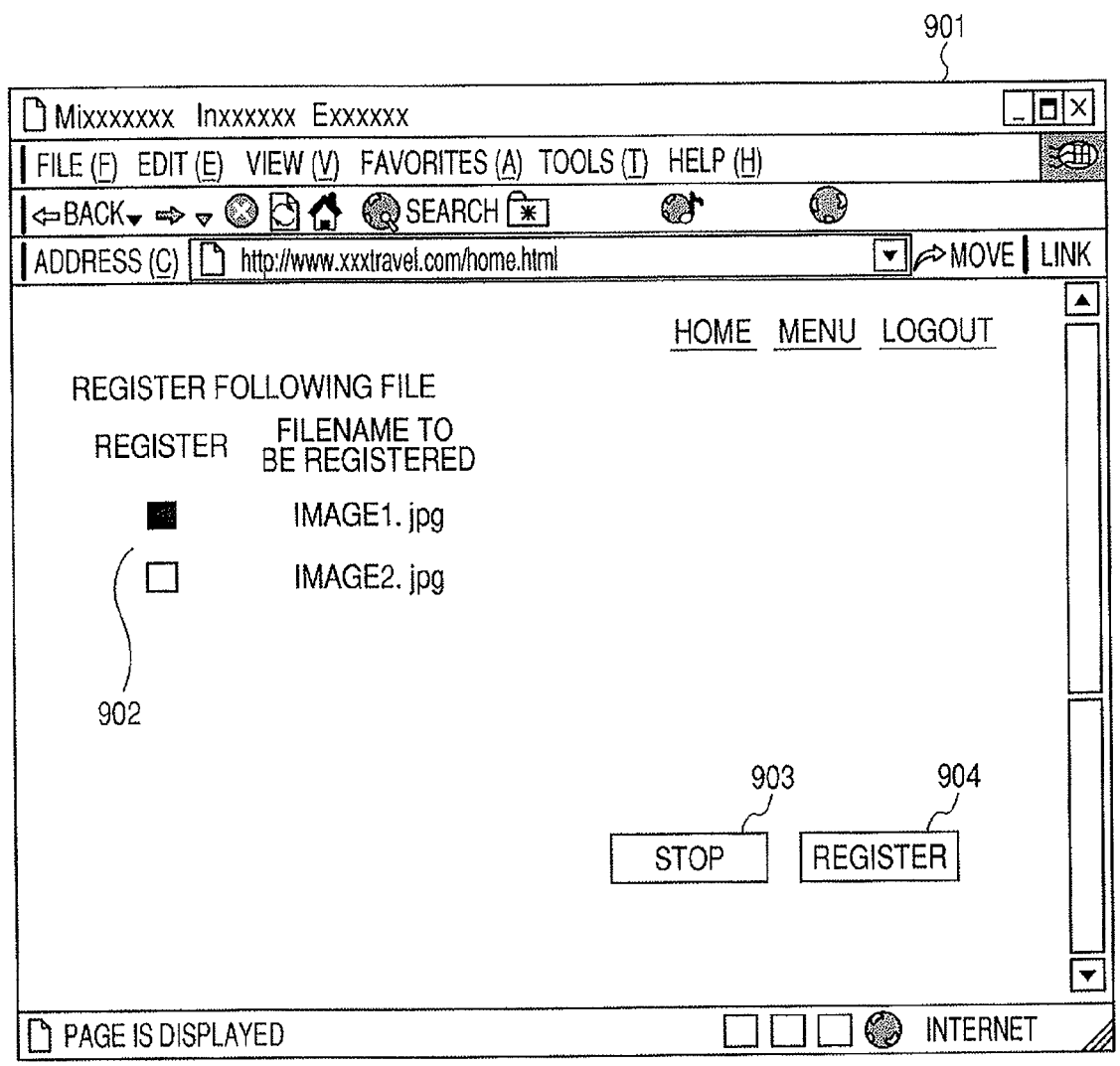
FIG. 13 is a diagram showing an example of a screen for confirming a data file to be registered with a server.

FIG. 13 is a diagram showing an example of a screen for confirming a data file to be registered with the server 107. This screen is displayed by the file registration module sent from the server to the browser of the client PC.

In FIG. 13, reference numeral 901 denotes a confirmation screen. Reference numeral 902 denotes a list of files to be registered. Even a file displayed in the list can be removed from the files to be registered with the server by causing the checkbox located at the top of the line for the file to be unselected, with a mouse or the like. In this example, "image2.jpg" is not to be registered with the server 107.

Reference numeral 903 denotes a stop button. When this button is selected with a mouse or the like, processing for registration with the server is stopped. Reference numeral 904 denotes a register button. When this button is selected with a mouse or the like, a selected file is registered with the server 107. Then, the screen is returned to the function list screen 601 in FIG. 10.

At step S106 in FIG. 9, the system administrator selects image data to be registered on the confirmation screen 901, and the user specifies the register button 904 to direct the server 107 to register the image data. Thereby, the file registration module on the client PC sends the selected image data to the server 107 and performs image registration processing.

The server 107 which has received this registration request performs preprocessing before image registration of the received image data at step S107. Here, processing for generating a thumbnail of the image data specified to be registered is performed.

Next, at step S108 in FIG. 9, the module 306 of the server 107 performs processing for registering the image data with the database 108. When the registration with the database 108 normally ends, the module 306 of the server 107 sends a screen notifying the normal end to the client PC. By the above processing, the registration of image data with the database 108 is completed. An example of this registration is shown in the table 401 and the like in FIGS. 17A and 17B to be described later. If the registration with the database 108 fails, the module 306 of the server 107 sends an error screen to the client PC.

Subsequently, at step S109 in FIG. 9, the system administrator specifies the image information/article master association button 604 on the function list screen 601 in FIG. 10. Then, the module on the client PC sends a direction to read image data to the server 107.

At step S110, the module 306 of the server 107 which has received this direction acquires image data, with which an article master (a data ID in the data table 404) is not associated, from the database 108, and returns it to the client PC. The module on the client PC which has received this reply displays the confirmation/selection screen shown in FIG. 14.

Figure 14:
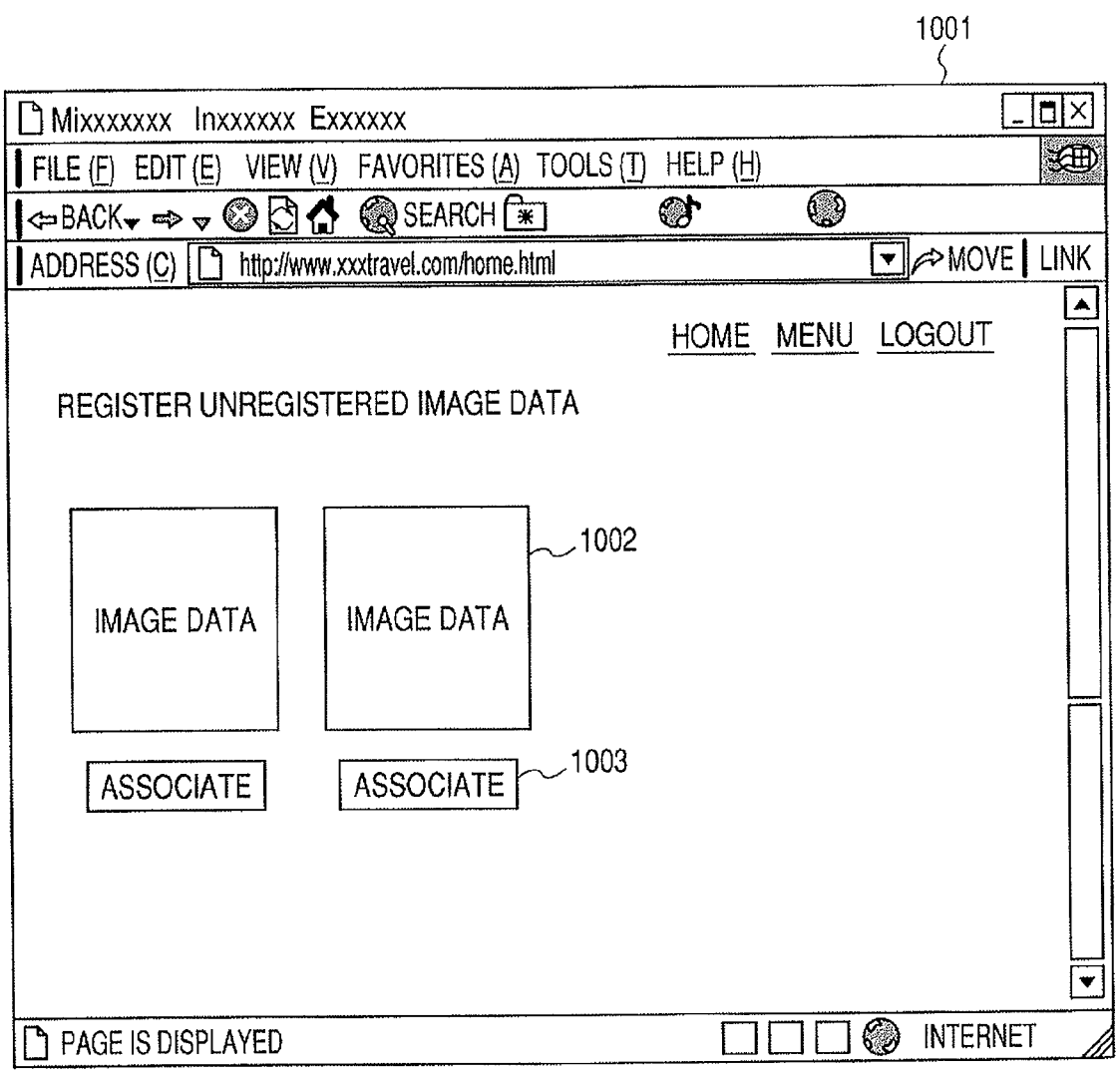
FIG. 14 is a diagram showing an example of a confirmation/selection screen of the present invention.

FIG. 14 is a diagram showing an example of the confirmation/selection screen of the present invention, which corresponds to a screen for confirming/selecting image data existing in the server 107 with which an article master is not associated.

In FIG. 14, reference numeral 1001 denotes the confirmation/selection screen. Reference numeral 1002 denotes a list of image data for which association has not been performed. Reference numeral 1003 denotes an association button.

At step S111 in FIG. 9, when the administrator selects this button with a PD such as a mouse, the module on the client PC sends an association request to the server 107 to start association processing of the selected image data.

At step S112, the server 107 which has received this request, sends an article master search screen (module) for selecting an article master to be associated, to the client PC.

The client PC which has received this reply displays the article master search screen.

Figure 15:
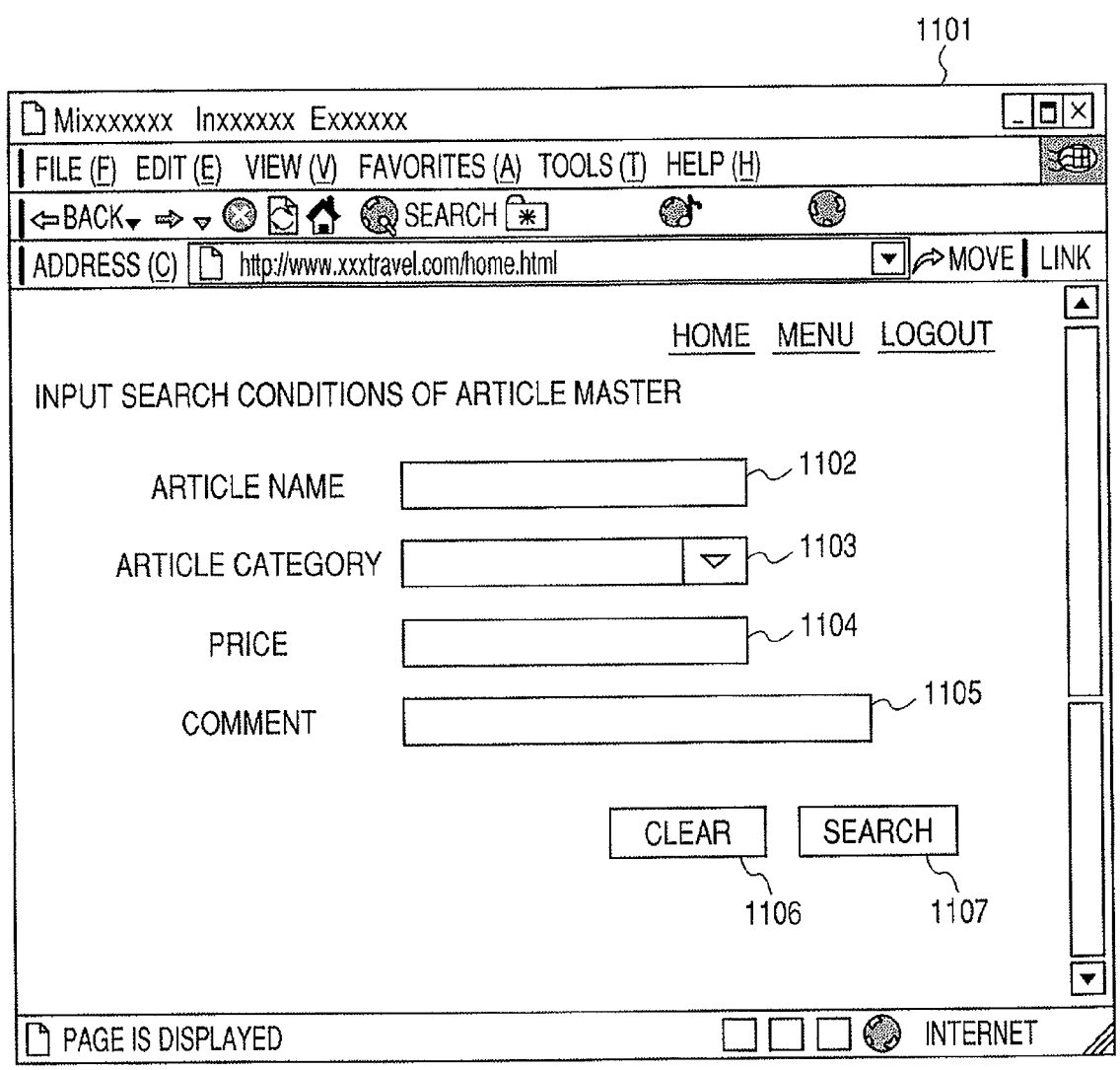
FIG. 15 is a diagram showing an example of an article master search screen in the present invention.

FIG. 15 is a diagram showing an example of the article master search screen in the present invention. This screen is displayed by a module sent from the server to the browser of the client PC.

In FIG. 15, reference numeral 1101 denotes a screen for searching for an article master (the article master search screen). Reference numerals 1102 to 1105 denote search items registered with the database 108. On this screen, article name 1102, article category 1103, article price 1104 and other comment information 1105 can be inputted as the search conditions.

Reference numeral 1106 denotes a clear button. When this button is selected, all inputted information is cleared. Reference numeral 1107 denotes a search button. When this button is selected, an article master is searched for under inputted search conditions.

That is, when this search button 1107 is selected by the administrator, the module on the client PC sends inputted search conditions to the server 107 to request search for an article master, at step S113.

Receiving this request, the server 107 searches the database 108 based on the received search conditions at step S114, and sends a result of the search (an article master search result screen) to the client PC at step S115.

The client PC which has received this reply displays the article master search result screen.

Figure 16:
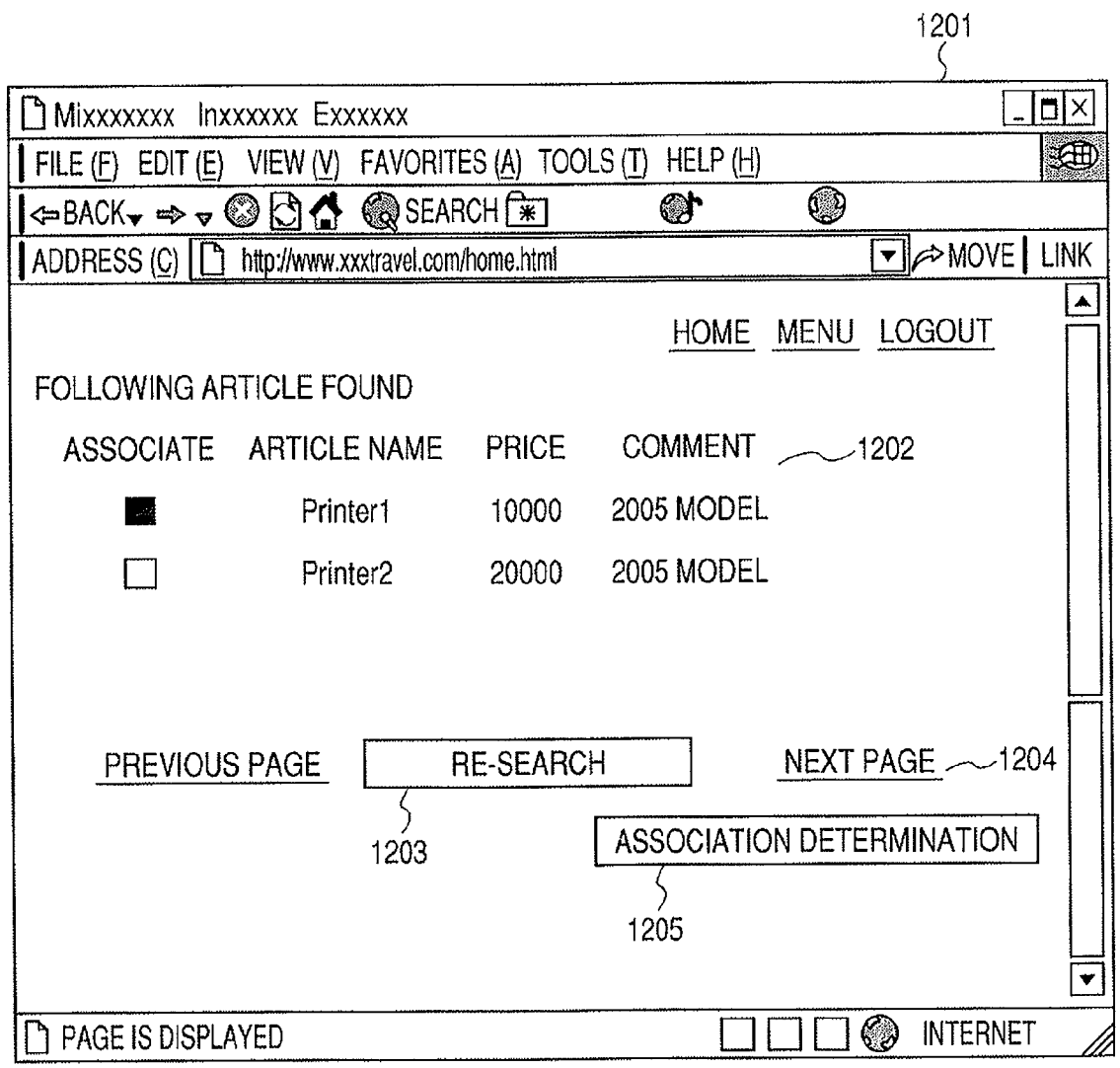
FIG. 16 is a diagram showing an example of an article master search result screen in the present invention.

FIG. 16 is a diagram showing an example of the article master search result screen in the present invention. This screen is displayed by a module sent from the server to the browser of the client PC.

In FIG. 16, reference numeral 1201 denotes the search result screen. Reference numeral 1202 denotes a list of the search results, in which information about retrieved article masters is displayed. Reference numeral 1203 denotes a re-search button. When this button is selected with a PD such as a mouse, the screen returns to the search screen in FIG. 15.

In this example, article information corresponding to two articles is displayed. As for the search result about other article information, the display can be switched by selecting a previous page button/a next page button 1204 with a PD such as a mouse.

Reference numeral 1205 denotes an association determination button. When this button is selected with a PD such as a mouse, processing for associating such article master data that the associated check box of the search results 1202 is enabled and the image data with each other is executed.

That is, at step S116 in FIG. 9, the module on the client PC sends a request to associate such article master data that the associated check box is enabled and the image data with each other, to the server 107.

The server 107 which has received this request performs processing for registering association information with the database 108 at step S117. When the registration with the database 108 normally ends, the module 306 of the server 107 sends information notifying the normal end, to the client PC. By the above processing, the registration of the association data with the database 108 is completed. An example of this registration is shown in the data/content management table 402 and the like in FIGS. 17A and 17B to be described later. Here, if the registration with the database 108 fails, the module 306 of the server 107 sends information notifying an error has occurred, to the client PC.

FIGS. 17A and 17B are diagrams showing an example of the content of the database 108 at the time when the article master registration, the image registration and the association end, and the same reference numerals are given to those that are the same as in FIG. 8.

As shown in FIG. 8, the content table 401 is for managing registered image data, and each of the image data is given a sequential content ID and managed. In the example in FIGS. 17A and 17B, for content ID's "1" to "1", "image1.jpg" to "image6.jpg" are registered, respectively.

As shown in FIG. 8, the data/content management table 402 is for managing association between each content and master data. In the example in FIGS. 17A and 17B, as for the data on the first line, data indicated by a data ID "1" and content indicated by a content ID "1" are associated with each other and registered in a form of a content classification ID "1".

As shown in FIG. 8, the content classification management table 403 is for managing the names of content classification ID's. In the example in FIGS. 17A and 17B, "article image" is registered for the content classification ID "1".

As shown in FIG. 8, the data table 404 is for managing information about article masters, and each article master data is given a sequential data ID (in the example in FIGS. 17A and 17B, data ID's "1" to "6") and managed. In the data table 404, each article master data is associated with the ID of the category to which the article master belongs (in the example in FIGS. 17A and 17B, category ID's "1" to "3") and managed.

As shown in FIG. 8, the category management table 407 is for managing categories, and article categories are given sequential ID's and managed. In the example in FIGS. 17A and 17B, "ink jet printer", "laser beam printer" and "digital camera" are registered for the category ID's "1", "2" and "3", respectively.

As shown in FIG. 8, the data item value table 405 is for managing actual values of the article master information, and values of data items (in the example in FIGS. 17A and 17B, "printer 1", "10000", "2005 model", . . . and the like) are stored. In the data item value table 405, association with article master information is made via a corresponding data ID (in the example in FIGS. 17A and 17B, data ID's "1" to "6"). Furthermore, the data item value table 405 is associated with the data definition item table 406 via the data item ID's (in the example in FIGS. 17A and 17B, data item ID's "1" to "3").

As shown in FIG. 8, the data definition item table 406 is for managing the names of data items, and data item names are given sequential ID's and managed. In the example in FIGS. 17A and 17B, "article name", "price" and "comment" are registered as data item ID's "1", "2" and "3", respectively.

FIG. 18 is a diagram showing an example of an output catalog template of the present invention.

In FIG. 18, reference numeral 1401 denotes a file which manages all the templates. In this file, template files 1402 to 1404 corresponding to respective priorities are managed, and the name, the number of insertion areas and the priority of each file are stored.

Reference numerals 1402 to 1404 denote template files corresponding to respective priorities. "Template1.fcp" 1402 is an example of a template with the highest priority, and "Template3.fcp" 1404 is an example of a template with the lowest priority.

In these template files 1402 to 1404, the content of a catalog is defined. For example, a product name field 1405 is an area into which master data is to be inserted. An article image filed 1406 is an area into which image data associated with the master is to be inserted. Furthermore, descriptions 1407 to 1409 indicate that ID's for uniquely identifying respective insertion fields are given and managed.

In the example in FIG. 18, the ID's beginning with "1" are given and defined as sequential numeric values. The ID "1" defines a product name field.

Descriptions 1408 and 1409 indicate that these definitions are repeated the number of times corresponding to the number of insertion masters. For example, in the description 1408, product name filed, price field and product image field are output areas corresponding to one item master, and they are repeatedly defined for the ID's "1" to "3" and the ID's "4" to "6". In the description 1409, product name field and product image field are output areas corresponding to one article master, and they are repeatedly defined four times under the ID's "1" to "2", the ID's "3" to "4", the ID's "5" to "6" and the ID's "7" to "8".

Though, in this embodiment, information such as the number of insertion areas and priorities are held in the file 1401 for managing all templates. However, such information may be held in a file for each template file according to priority (in the example in FIG. 18, the template files 1402 to 1404). It is also possible that setting is not made for a template itself but made when a template is registered with the system.

Returning to the description of the flowchart in FIG. 9, template registration processing will be described below.

At step S118 in FIG. 9, the administrator performs an operation of preparing for registration of a template. When the administrator specifies the catalog template registration button 605 on the function list screen 601 shown in FIG. 10, the browser of the client PC requests the server 107 to prepare for registration of a template, to the server 107.

The server 107 which has received this request, sends the file registration module to the client PC. In this case, if the file registration module already exists on the client PC, the module is not sent. In this embodiment, the file registration module has already been downloaded at step S105 similar to the module shown in FIG. 12, it is not sent. However, a module different from that in FIG. 12 may be prepared as this module. In this case, the module is separately downloaded to the client PC.

Then, the CPU of the client PC performs control to display the file selection screen in the file registration module shown in FIG. 12 on the monitor. Then, the administrator selects a template file to be registered on this screen and selects the upload button 806 with a PD such as a mouse. Then, the file registration module executed on the client PC performs control to display the registration confirmation screen shown in FIG. 13 based on the template file selected on the file selection screen. A template registration screen will be described below.

Figure 19:
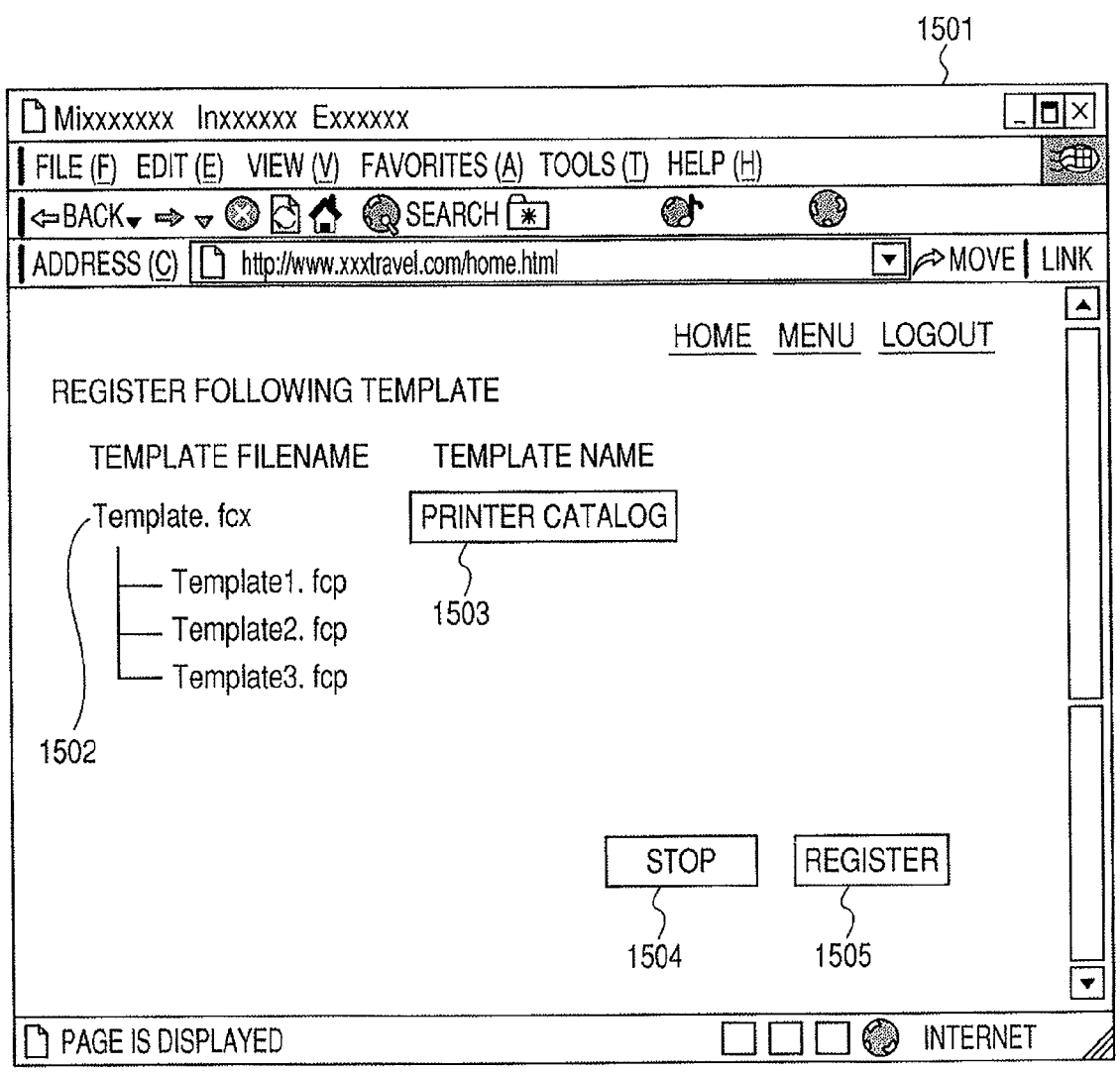
FIG. 19 is a diagram showing an example of a screen for registering a template (a template registration screen) of the present invention.

FIG. 19 is a diagram showing an example of a screen for registering a template (the template registration screen) of the present invention. This screen is displayed by a module sent from the server 107 to the browser of the client PC. In FIG. 19, reference numeral 1501 denotes a confirmation screen. Reference numeral 1502 denotes a file for templates to be registered, which corresponds to a file selected on the file selection screen shown in FIG. 12. In the file for templates to be registered 1502, a template for managing the whole and template files for respective priorities included therein are displayed. The template filename of the template for managing the whole is stored as the template file name in the output table 408 in FIG. 8. The filenames of the template files for respective priorities are stored as the template files for respective priorities in the file 1401 in FIG. 18 and as the filenames in the compound definition table 409 in FIG. 8.

Reference numeral 1503 denotes a template name input field in which a template name is to be inputted. A template name inputted in this template name input field 1503 is stored as the template name in the output table 408 in FIG. 8.

Reference numeral 1504 denotes a stop button. When this button is selected with a PD such as a mouse, the module on the client PC stops processing for registration with the server 107.

Reference numeral 1505 denotes a register button. When this button is selected with a PD such as a mouse, the module on the client PC performs processing for registering a selected template with the server 107.

That is, at step S119 in FIG. 9, the module on the client PC sends a selected template to the server 107 and requests registration of the template.

Receiving this request, the server 107 performs processing to be performed before registration for the received template at step S120.

Next, at step S121 in FIG. 9, the module 306 of the server 107 performs processing for registering the template data with the database 108. If the registration with the database 108 normally ends, then the module 306 of the server 107 sends a screen notifying the normal end, to the client PC. By the above processing, the registration of templates for respective priorities with the database 108 is completed. An example of this template registration is shown in FIG. 20 to be described later. Here, if the registration with the database 108 fails, the module 306 of the server 107 sends an error screen to the client PC.

FIG. 20 is a diagram showing an example of the content of the database 108 at the time when the template registration ends, and the same reference numerals are given to those that are the same as in FIG. 8.

In the output table 408, "Template.fcx" shown in FIG. 18 is registered, with an output ID "1" and a template name "print catalog".

In the compound definition table 409, each of the fcp files included in "Template.fcx" ("Template1.fcx", "Template2.fcx" and "Template3.fcx") is registered together with priority and the number of insertion areas.

In the item definition table 410, data to be inserted corresponding to the order number of each field is associated. If there are multiple insertion areas in one template, association for the first insertion set is stored, and the subsequent insertion sets are automatically associated based on the number of insertion areas. For example, in the example of FIG. 20, output data "1" is associated with the order number "1" for the template ID "1".

Processing indicating the processing for searching for an article master and outputting a catalog of the present invention will be described below with reference to FIGS. 21 to 23.

Figure 21:
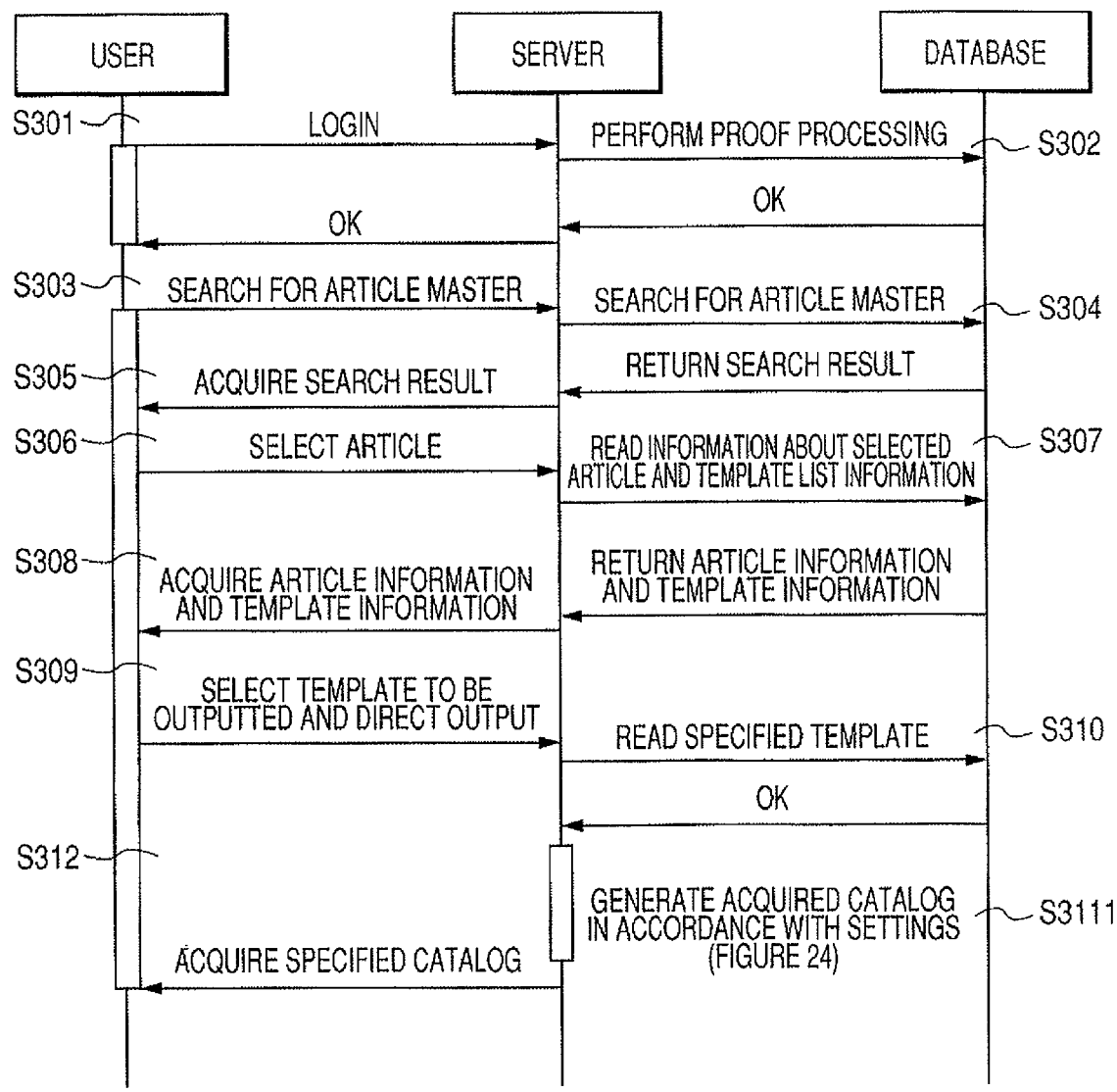
FIG. 21 is a flowchart showing an example of a second control procedure in the present invention.

FIG. 21 is a flowchart showing an example of a second control procedure in the present invention, which corresponds to processing indicating the processing for searching an article master and outputting a catalog of the present invention. In the figure, S301, S303, S305, S306, S308, S309 and S312 correspond to operations performed by the user from the client PC or processings on the client PC side. The operations and processings are realized with the use of a module to be executed on the Web browser by the CPU of the client PC (such as a module received from the server 107). In the figure, S302, S304, S307, S310, S311 and S311 are realized with the use of the module 306 or the catalog generation module 307 executed on the memory by the CPU of the server 107.

First, at step S301, a system administrator executes login processing from the client PC with an account and a password. In this case, any authentication may be used in addition to the use of the account and the password. In this login processing, the Web browser of the client PC sends a login request including information about the inputted account and password, to the server 107.

Receiving this request, the module 306 of the server 107 inquires of the database 108 about whether the use of this system is permitted for the inputted account and password, and performs authentication processing. Here, in the case of an account for which the use of this system is not permitted, the module 306 of the server 107 sends an error screen to the client PC.

On the other hand, in the case of an account for which the use of this system is permitted, the module 306 of the server 107 sends the search screen (FIG. 15) to the client PC.

The browser of the client PC which has received this search screen performs control to display the screen sent from the server 107.

When a user performs an article search operation at step S303, the module on the client PC sends inputted search conditions to the server 107 to request search for article data.

The module 306 of the server 107 which has received this request performs processing for searching for the article data registered with the database 108 based on the received search conditions. Then, the module 306 of the server 107 which has received the search result from the database 108 sends the search result to the client PC as a list of article data.

Then, at step S305, the module on the client PC acquires the article search result sent from the server 107 and performs control to display it.

Figure 22:
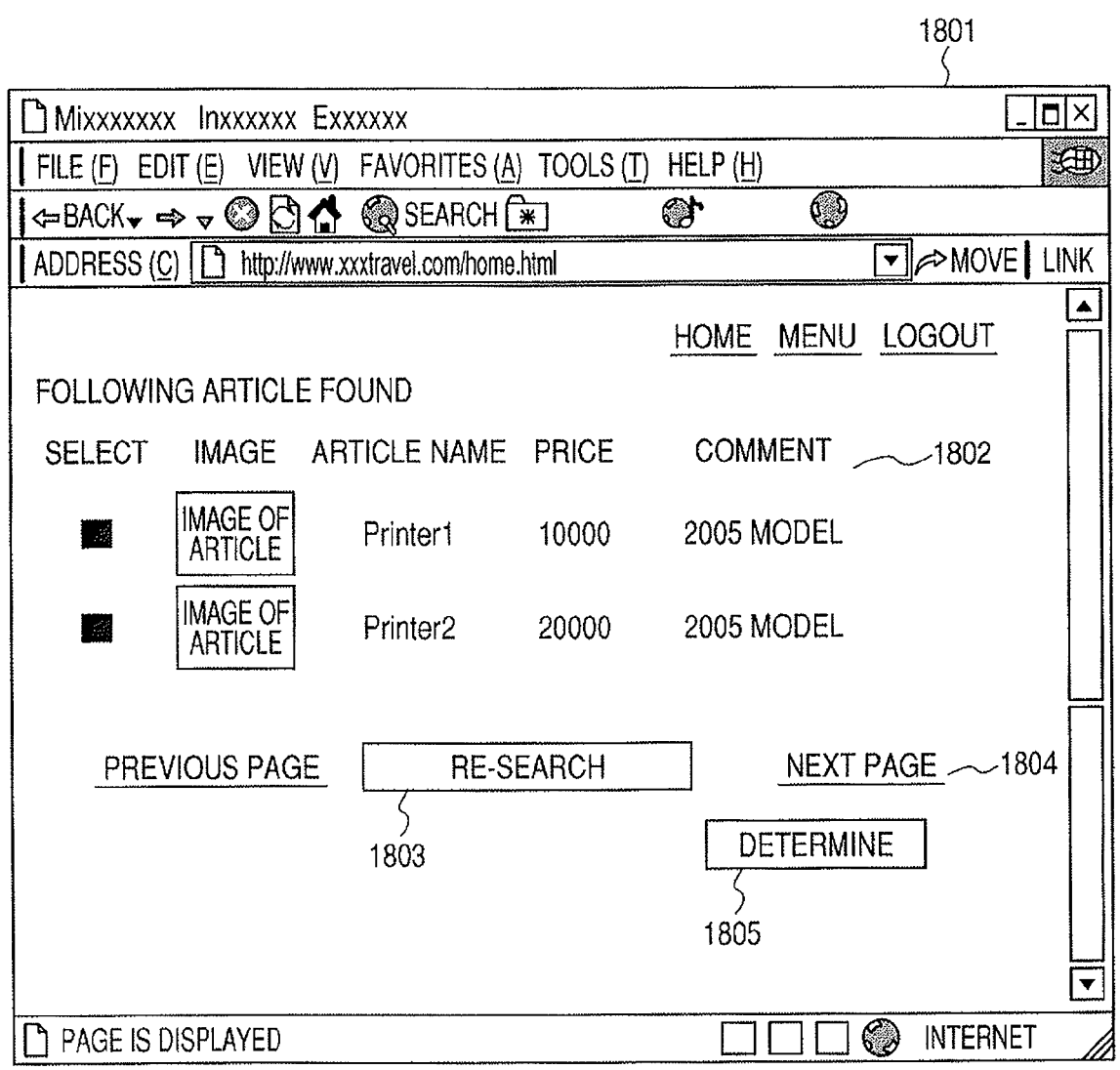
FIG. 22 is a diagram showing an example of an article search result screen of the present invention.

FIG. 22 is a diagram showing an example of an article search result screen of the present invention.

In FIG. 22, reference numeral 1801 denotes the article search result screen. Reference numeral 1802 denotes information about the searched article masters. In the example in FIG. 22, images of article image, article names, prices and comments are displayed.

Reference numeral 1803 denotes a re-search button. When this button is selected with a PD such as a mouse, the screen returns to the search screen, and search can be performed again. In this example, article information corresponding to two articles are displayed. As for the search result about other article information, the display can be switched by selecting a previous page button/a next page button denoted by reference numeral 1804 with a PD such as a mouse.

Reference numeral 1805 denotes an output master determination button. When this button is selected by a PD such as a mouse, it is possible to output a catalog of such article data that the selection check box of the search results 1802 is enabled.

When the user selects an article on the search result screen 1801 and specifies a determine button 1805, the module on the client PC sends information about the selected article to the server 107 to request article information and related template information at step S306 in FIG. 21.

At step S307, the server which has received the request sends information related to the specified article and catalog template list information from the database 108 and returns them to the client PC.

Figure 23:
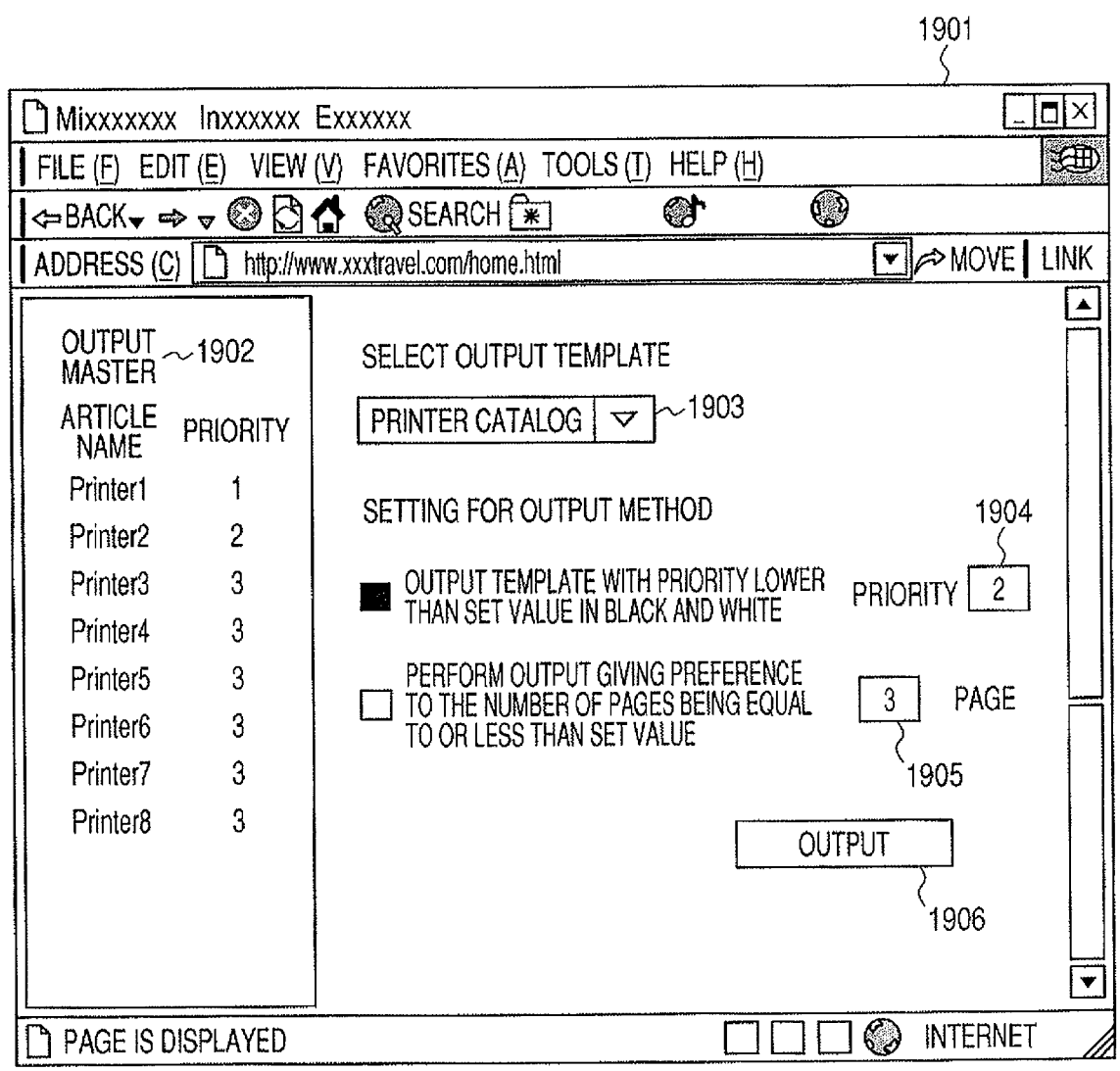
FIG. 23 is a diagram showing an example of a screen for setting an output method (an output method setting screen) in the present invention.

At step S308, the module on the client PC acquires the list of article masters to be outputted and the list of templates which have returned from the server 107, and displays the output method setting screen shown in FIG. 23 based on the acquired data. The output method setting screen will be described below.

FIG. 23 is a diagram showing an example of a screen for setting an output method (the output method setting screen) in the present invention.

In FIG. 23, reference numeral 1901 denotes the output method setting screen. Reference numeral 1902 denotes a list of the articles selected at step S306 in FIG. 21 is displayed according to priorities.

Reference numeral 1903 denotes display of a template managed by the server, and the displayed template can be arbitrarily switched and selected by a PD such as a mouse.

Boxes 1904 and 1905 are for setting the output method, and "enabled" and "disabled" can be switched by selecting each of the associated checkboxes.

When the checkbox of the box 1904 is enabled with a PD such as a mouse, setting is made so that output of a template with priority equal to and below a set value is switched to black-and-white output. In the example in FIG. 23, since the priority "2" is set, templates with the priorities 2 and 3 are created in black and white. Meanwhile, the checkbox is disabled, setting is made so that all the templates are outputted in color.

When the checkbox of the box 1905 is enabled with a PD such as a mouse, setting is made so that output is performed giving preference to generation of a catalog with a specified or smaller number of pages (FIG. 7 described above). In the example in FIG. 23, since "3" pages is set, output is performed giving preference to limitation of the number of pages to three or less. On the other hand, if the checkbox is disabled, then setting is made so that output is performed giving preference to priority (FIG. 6 described above).

Reference numeral 1906 denotes an output button. When this output button is selected by a PD such as a mouse, output of a catalog is started in accordance with the settings.

At step S309 in FIG. 21, the user selects a template and an output method to be used for output on the output method determination screen 1901. Furthermore, the user specifies the output button 1906 to direct output. In response to this operation, the module on the client PC sends article master data to be outputted, the template and the output method which have been selected to the server 107 and requests start of the catalog output processing.

At step S310, the catalog generation module 307 of the server 107 which has received this request acquires the specified template from the database 108, sorts the article master data in order of priority and advances the processing to step S311.

Next, at step S311, the catalog generation module 307 of the server 107 generates a catalog in accordance with the output method setting received from the client PC and performs control to return it to the client PC. The details of the processing for generating a catalog in accordance with the output method setting at step S311 will be shown in FIG. 24 to be described later.

Then, at step S312, the client PC acquires the specified catalog from the server 107.

The processing for generating a catalog in accordance with the output method setting, which is shown in step S311 in FIG. 21, will be described below with reference to FIGS. 24 to 32.

Figure 24:
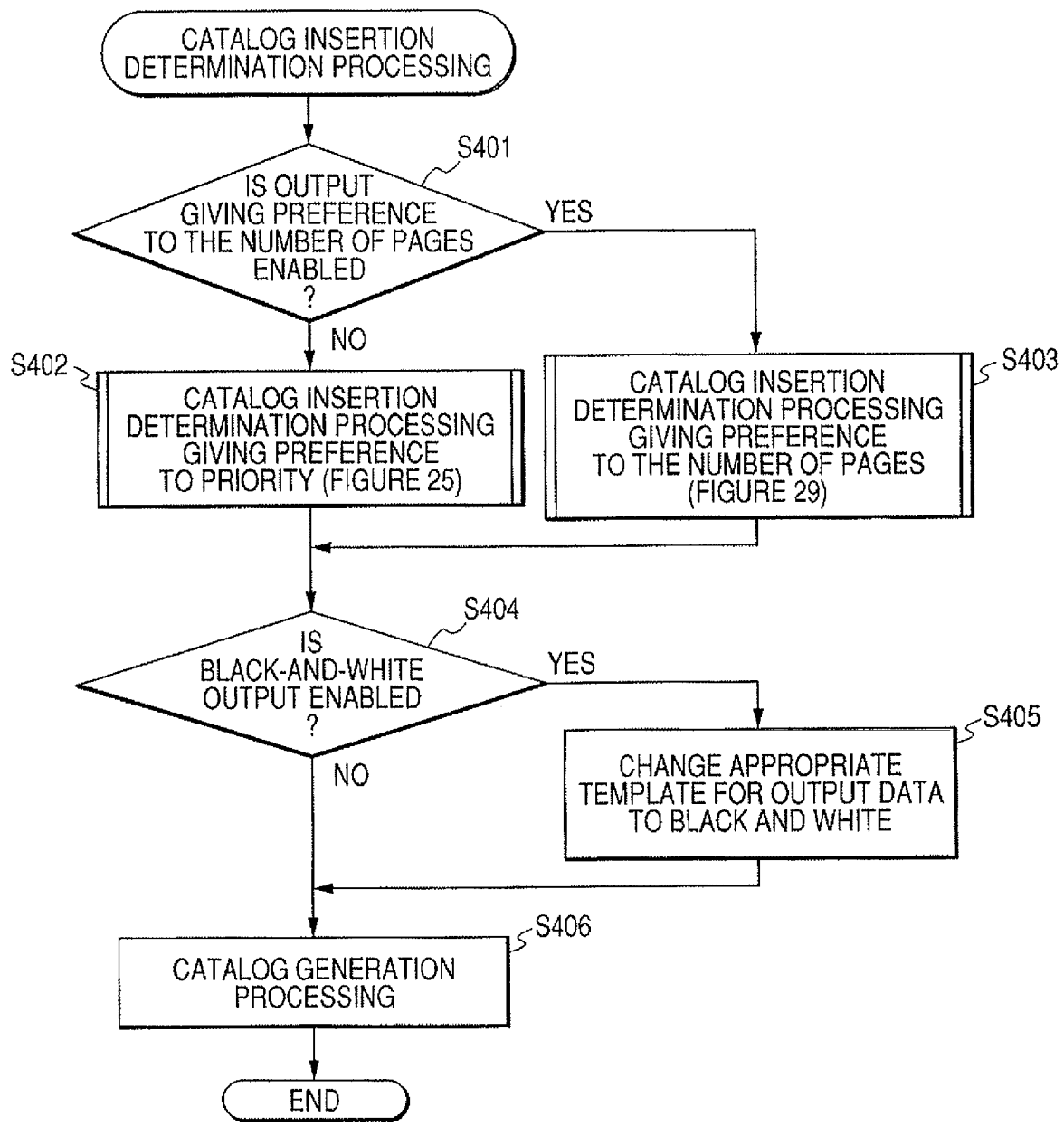
FIG. 24 is a flowchart showing an example of a third control procedure in the present invention.

FIG. 24 is a flowchart showing an example of a third control procedure in the present invention, which corresponds to the processing for generating a catalog in accordance with the output method setting shown in step S311 in FIG. 21. In the figure, steps S401 to S406 are realized with the use of the catalog generation module 307 executed on the memory by the CPU of the server 107.

First, at step S401, the catalog generation module 307 of the server 107 determines whether "page-priority output (equivalent to the value set for the checkbox 1905 in FIG. 23) is enabled or not in the setting of output method acquired from the client PC.

Then, if it is determined at step S401 that "page priority output" is not enabled, then the catalog generation module 307 of the server 107 advances the processing to step S402. Then, at step S402, the catalog generation module 307 of the server 107 performs catalog insertion determination processing giving preference to priority and generates a data file for insertion (FIG. 28) on the HD or the like. Then, the catalog generation module 307 advances the processing to step S404. The details of the catalog insertion determination processing giving preference to priority will be shown in FIG. 25.

On the other hand, if it is determined at step S401 that "page priority output" is enabled, then the catalog generation module 307 of the server 107 advances the processing to step S403. Then, at step S403, the catalog generation module 307 of the server 107 performs catalog insertion determination processing giving preference to the number of pages and generate a data file for insertion on the HD or the like. Then, the catalog generation module 307 advances the processing to step S404. The details of the catalog insertion determination processing giving preference to the number of pages will be shown in FIG. 29.

Then, at step S404, the catalog generation module 307 of the server 107 determines whether black-and-white output (equivalent to the value set for the checkbox 1904 in FIG. 23) is enabled or not. If it is determined that black-and-white output is not enabled, then the catalog generation module 307 of the server 107 immediately advances the processing to step S406.

On the other hand, if it is determined at step S404 that the black-and-white output is enabled, then the catalog generation module 307 of the server 107 advances the processing to step S405. Then, at step S405, the catalog generation module 307 of the server 107 changes information about the template corresponding to the output data to black and white. For example, in the example in FIG. 23, since the priority "2" is set, information about templates with the priorities 2 and 3 is changed to black and white. That is, "Color=Color" in "Form Sections" in which templates with priority 2 and priority 3 are specified, respectively, in "Form=" in a data file for insertion (for example, FIG. 27 to be described later) is changed to "Color=Black&White". An example of the changed data file for insertion is shown on Form Sections 2801 and 2802 in FIG. 32 to be described later. Then, the catalog generation module 307 advances the processing to step S406.

Figure 28:
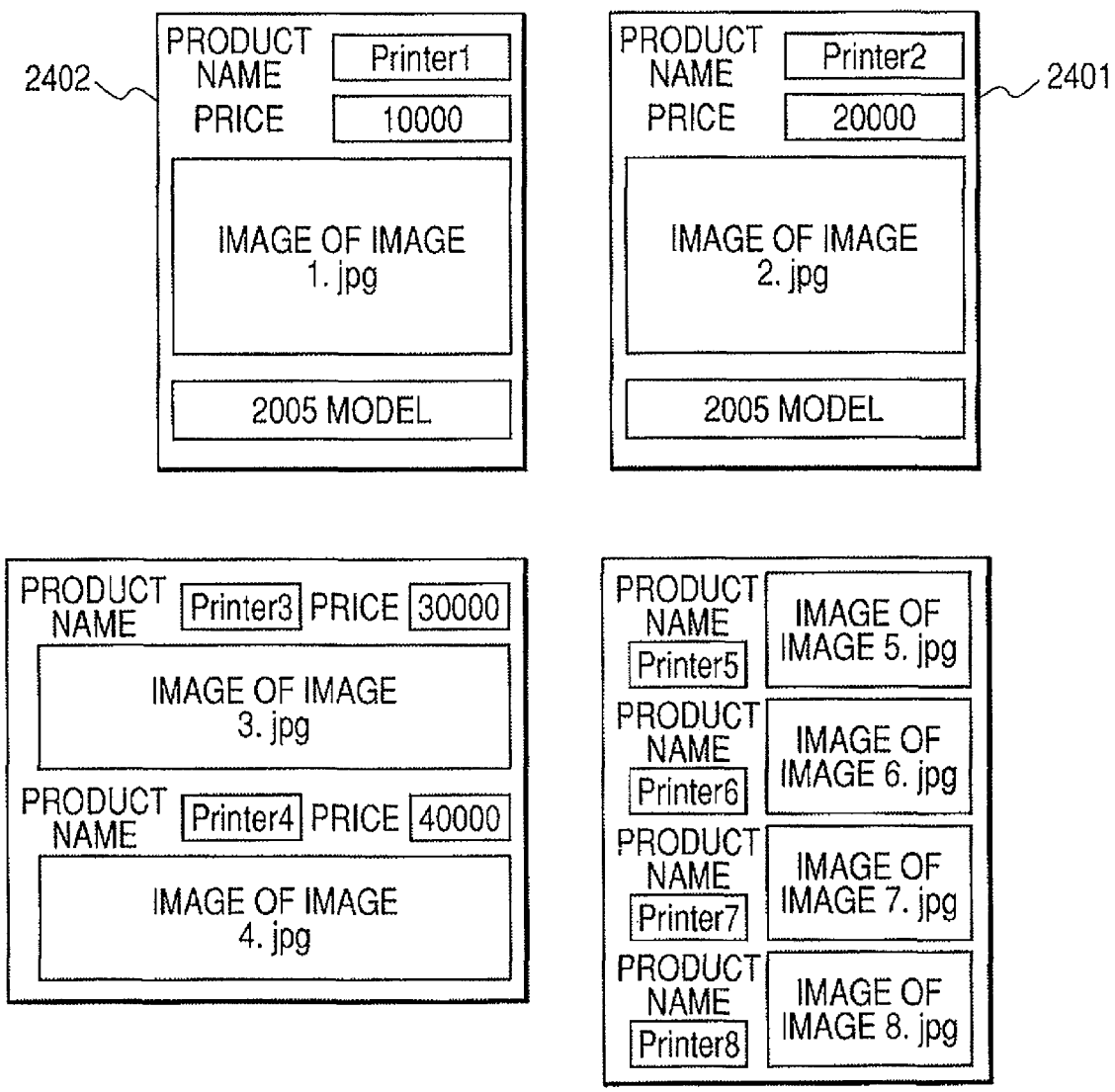
FIG. 28 is a diagram showing an example of the image of a catalog generated at S406 in FIG. 24 based on a data file for insertion which is finally generated by the catalog insertion determination processing giving preference to priority shown in FIG. 25.
Figure 31:
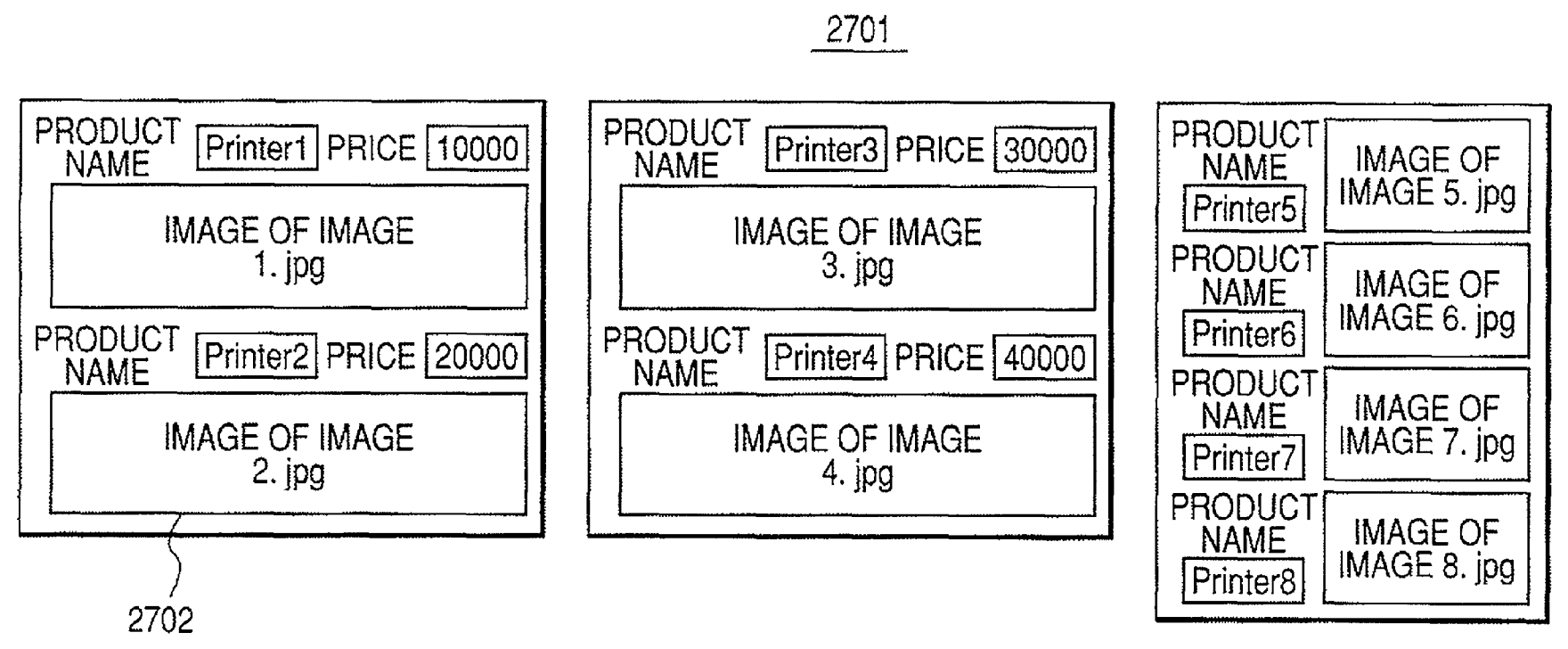

Then, at step S406, the catalog generation module 307 of the server 107 executes catalog generation processing based on the data file for insertion which has been generated through steps S401 to S405 and ends the processing. An example of the generated catalog is shown in FIGS. 28 and 31 to be described later.

If the result of the catalog insertion determination processing giving preference to the number of pages at step S403 is an error, then information to that effect is sent to the client PC, and the processing is immediately ended, though this is not shown in FIG. 24, The catalog insertion determination processing giving preference to priority shown at step S402 in FIG. 24 will be described below with reference to FIGS. 25 to 28.

Figure 25:
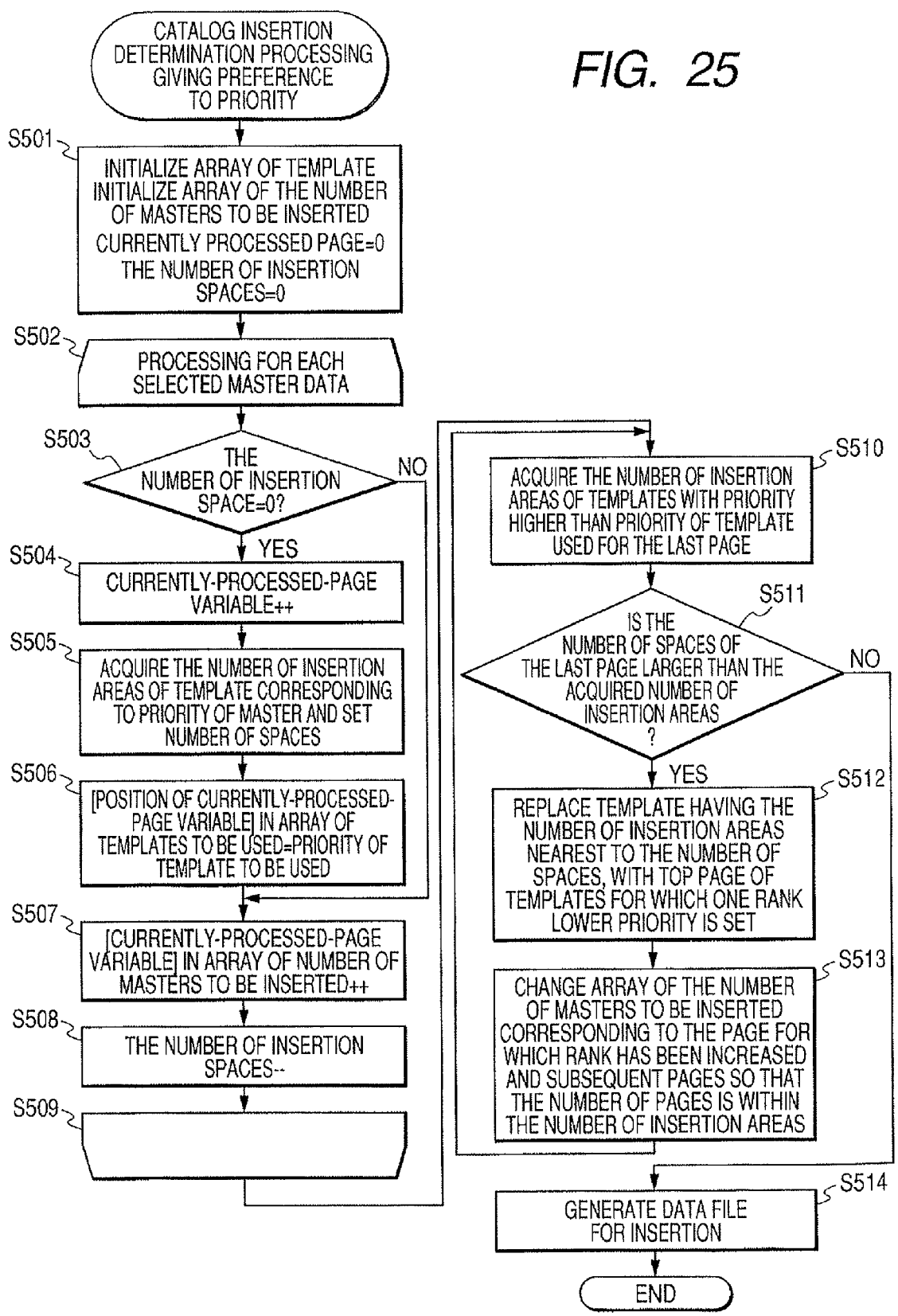
FIG. 25 is a flowchart showing an example of a fourth control procedure in the present invention.

FIG. 25 is a flowchart showing an example of a fourth control procedure in the present invention, which corresponds to the catalog insertion determination processing giving preference to priority shown at step S402 in FIG. 24. In the figure, steps S501 to S514 are realized with the use of the catalog generation module 307 executed on the memory by the CPU of the server 107.

At step S501, the catalog generation module 307 of the server 107 initializes the array of templates to be used, initializes the array of the number of masters to be inserted, sets the currently-processed-page variable to "0" and sets the number-of-insertion-spaces variable to "0".

The array of templates to be used is for storing which template is to be used for each page of an output catalog, and it is secured on the memory of the server 107. The array of the number of masters to be inserted is for storing how many masters to be outputted for each page, and it is secured on the memory of the server 107. Furthermore, the currently-processed-page variable is for storing the number of catalog pages currently processed, and it is secured on the memory of the server 107. The number-of-insertion-spaces variable is for storing the number of insertion spaces of the page currently processed, and it is secured on the memory of the server 107.

Figure 26:
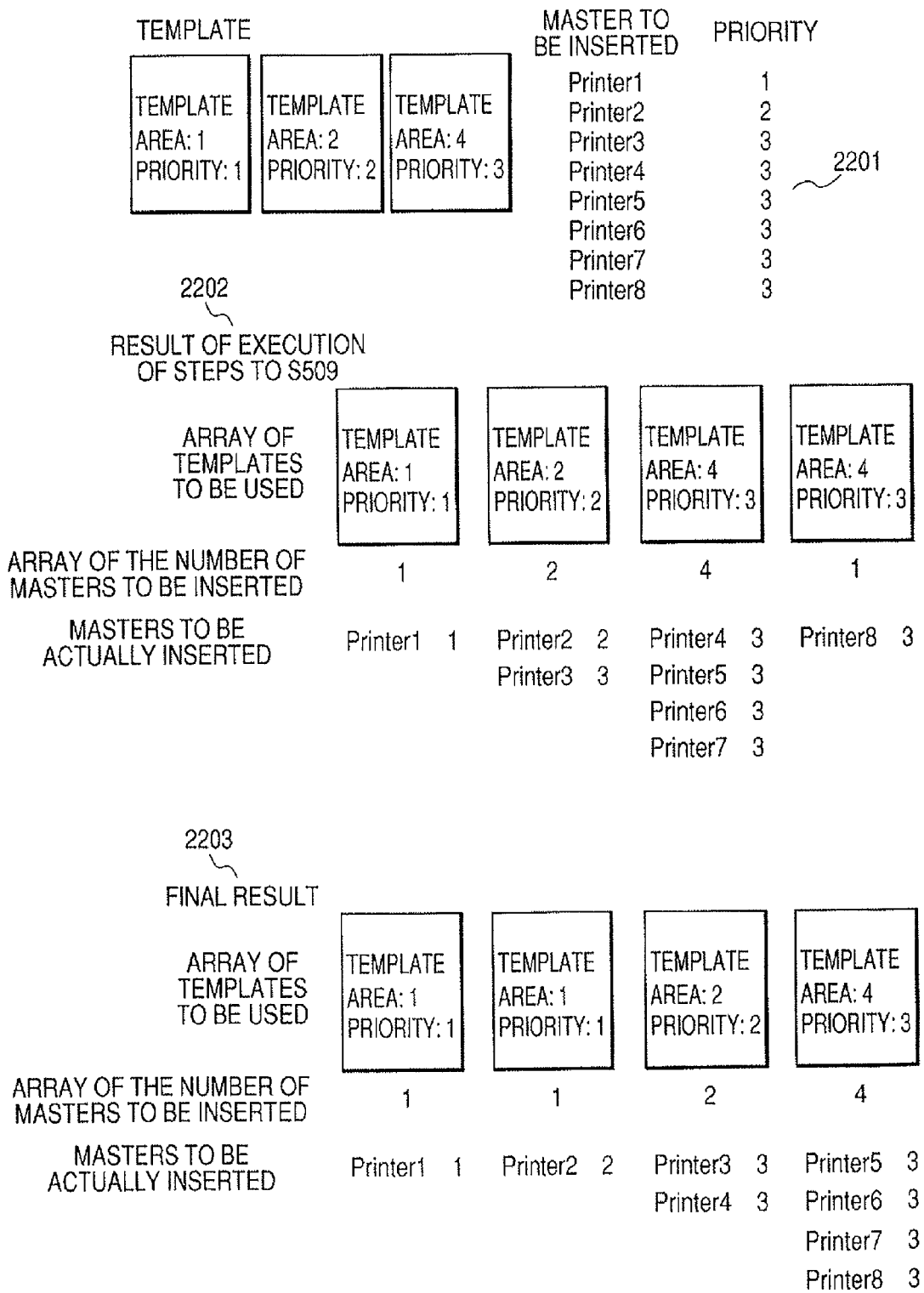
FIG. 26 is a diagram showing the image of masters to be inserted and templates at the time when catalog insertion determination processing giving preference to priority shown in FIG. 25 is performed.

Examples of the masters to be inserted which are being processed, the image of a template, the array of templates to be used and the array of the number of masters to be inserted in this flowchart are shown in FIG. 26.

Next, at steps S502 to S509, the catalog generation module 307 of the server 107 performs loop processing for each of the master data selected for output and determines the templates in accordance with order of priority and the insertion position of masters.

To speak in detail, the catalog generation module 307 of the server 107 checks whether the number of insertion spaces of the page currently processed is "0" or not at step S503. Then, if it is determined that the number of insertion spaces of the page currently processed is not "0", it means that there is space, and therefore, the catalog generation module 307 advances the processing to step S507.

If the catalog generation module 307 of the server 107 determines at step S503 that the number of insertion spaces of the page currently processed is "0", it means that there is no space, and therefore, the catalog generation module 307 advances the processing to step S504.

Then, at step S504, the catalog generation module 307 of the server 107 increments the currently-processed-page variable and advances the processing to step S505.

Then, at step S505, the catalog generation module 307 of the server 107 acquires the number of insertion areas of a template corresponding to the priority of the selected master currently processed, and sets it to the number-of-insertion-spaces variable.

Next, at step S506, the catalog generation module 307 of the server 107 sets the priority of a template to be used, in the area of the currently-processed-page variable in the array of templates to be used, and advances the processing to step S507.

Then, at step S507, the catalog generation module 307 of the server 107 increments the currently-processed-page variable on the array of the number of masters to be inserted.

Then, at step S508, the catalog generation module 307 of the server 107 decrements the number of insertion spaces.

If it is determined that the processing through steps S503 to S508 described above has not been executed for all the master data selected for output, then the processing through steps S503 to S508 is repeated. On the other hand, if it is determined that the processing through steps S503 to S508 described above has already been executed for all the master data selected for output, then the processing is advanced to step S510.

At and after step S510, if there is left much space in the last page after performing the output method determined through the steps to S509, processing for modifying templates and insertion positions is performed. The result of execution of the steps to step S509 is shown in description 2202 in FIG. 26. The final result of steps after step S510 is shown in description 2203 in FIG. 26.

The processing at and after step S510 will be described below in detail.

First, at step S510, the catalog generation module 307 of the server 107 acquires the insertion areas of all the templates with priority higher than the priority of the template used for the last page.

Next, at step S511, the catalog generation module 307 of the server 107 compares the acquired value and the number of insertion spaces of the last page. Then, as a result of the comparison, if it is determined that the number of spaces of the last page is larger than any of the numbers of insertion areas, then the catalog generation module 307 of the server 107 advances the processing to step S512.

At step S512, the catalog generation module 307 of the server 107 replaces a template with the number of insertion areas nearest to the number of the spaces, with the top page of templates for which the priority one rank lower than that of the template is set. That is, the priority stored in the area in the array of templates to be used, which corresponds to the top page of templates with priority one rank lower than the template having the number of insertion areas nearest to the number of spaces, is raised by one rank.

Furthermore, at step S513, the catalog generation module 307 of the server 107 changes the array of the number of masters to be inserted corresponding to the page for which the template has been changed at step S512 and the subsequent pages so that the number of masters to be inserted is within the number of insertion areas of each template. Then the processing is returned to step S510.

As described above, by repeating the processing through steps S510 to S513, output templates and master insertion positions are adjusted so that the blank space is reduced as far as possible.

On the other hand, if it is determined at step S511 that the number of spaces of the last page is smaller than the number of insertion areas, the catalog generation module 307 of the server 107 advances the processing to step S514.

Then, at step S514, the catalog generation module 307 of the server 107 generates a data file for insertion on the HD or the like based on the array of templates to be used and the array of the number of masters to be inserted which are held on the memory and ends the processing. An example of the data file for insertion is shown in FIG. 27.

FIG. 26 is a diagram showing the image of masters to be inserted and templates at the time when the catalog insertion determination processing giving preference to priority shown in FIG. 25 is performed.

In FIG. 26, reference numeral 2201 denotes an example of templates and masters to be inserted which are to be used.

Reference numeral 2202 denotes the result of executing the steps to step S509 in FIG. 25, and "3" spaces exist on the last page. After that, by replacing the template with the priority 2 which has the number of insertion areas nearest to the number of spaces "3", with the template with the priority 3 for the third page, through the processing at and after step S510, the number of spaces of the fourth page is "1".

Furthermore, by replacing the template with the priority 1 having the number of insertion areas nearest to the number of spaces "1", with the template with the priority 2 for the second page, the number of spaces for the last page is "0". Reference numeral 2203 denotes the image of this final result. In this way, the number of spaces of the last page can be reduced to the minimum without changing the number of pages.

FIG. 27 is a diagram showing an example of a data file for insertion in the case where the final result 2203 shown in FIG. 26 is obtained.

As shown in FIG. 27, the page starts at "Form Section" 2301; a template file to be used is specified by "Form="; and whether to use "Color" or "Black&White" is specified by "Color=". An example in which "Black&White" is specified by "Color=" is shown in FIG. 32 to be described later.

In "Body Data Section" 2302, data for insertion separated with commas are enumerated so that they correspond to sequential numbers beginning with 1. The catalog generation processing is performed based on this data, FCX files and FCP files of templates and image data files to be inserted "image1.jpg" to "image8.jpg".

FIG. 28 is a diagram showing an example of the image of a catalog generated at S406 in FIG. 24 based on a data file for insertion which is finally generated by the catalog insertion determination processing giving preference to priority shown in FIG. 25.

Reference numeral 2401 denotes catalog data, and data corresponding to four pages is created in accordance with specified settings. Since all the pages are specified to be outputted in color in this output, the actual data is color data. Actually, images obtained by rasterizing respective files of image data are inserted into areas including an image area of 2402.

The catalog insertion determination processing giving preference to the number of pages shown at step S403 in FIG. 24 will be described below with reference to FIGS. 29 to 31.

Figure 29:
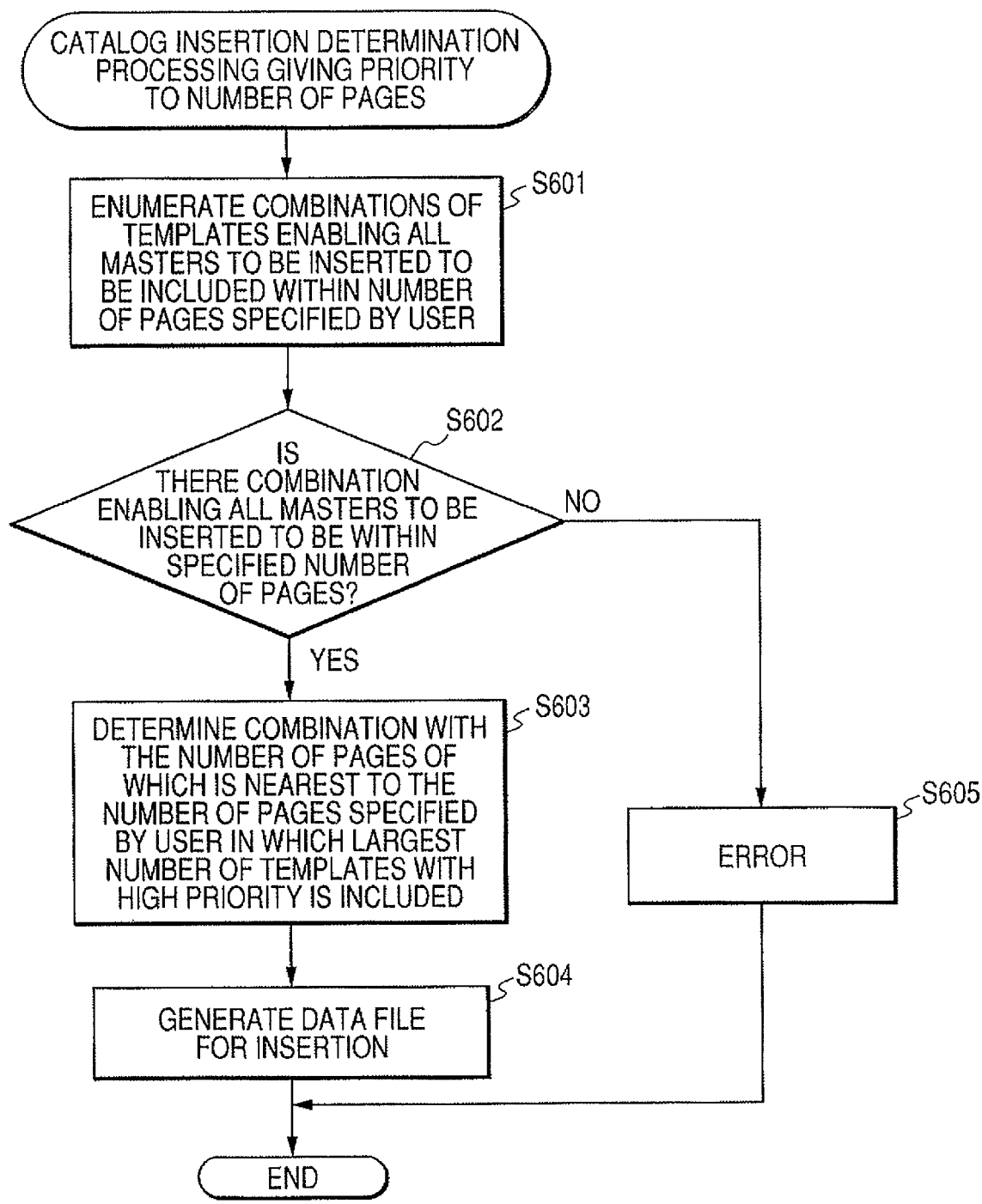
FIG. 29 is a flowchart showing an example of a fifth control procedure in the present invention.

FIG. 29 is a flowchart showing an example of a fifth control procedure in the present invention, which corresponds to the catalog insertion determination processing giving preference to the number of pages shown at step S403 in FIG. 24. In the figure, steps S601 to S604 are realized by the catalog generation module 307 executed on the memory by the CPU of the server 107. Reference numeral 2601 in FIG. 30 to be described later denotes an example of templates and masters to be inserted.

At step S601, the catalog generation module 307 of the server 107 enumerates combinations of templates enabling all the masters to be inserted to be included within the number of pages specified by the user, on the memory. Reference numeral 2602 in FIG. 30 denotes an example of this enumeration.

Next, at step S602, the catalog generation module 307 of the server 107 checks whether or not there is any combination enabling the insertion to be within the specified number of pages (whether or not such enumerated combinations exist). Then, if it is determined that there is not a combination enabling the insertion to be within the specified number of pages (that such enumerated combinations do not exist), then the catalog generation module 307 of the server 107 advances the processing to step S605.

Then, at step S605, the catalog generation module 307 of the server 107 returns an error to the client PC and ends the processing.

On the other hand, if it is determined at step S602 that there is a combination enabling the insertion to be within the specified number of pages (that the enumerated combinations exist), then the catalog generation module 307 of the server 107 advances the processing to step S603.

Then, at step S603, the catalog generation module 307 of the server 107 determines, from the enumerated combinations, such a combination the number of pages of which is nearest to the number of pages specified by the user and in which the largest number of templates with high priority is included.

Then, at step S604, the catalog generation module 307 of the server 107 generates a data file for insertion on the HD or the like in accordance with the combination of templates determined at step S603 and ends the processing.

FIG. 30 is a diagram showing the image of masters to be inserted and templates at the time when the catalog insertion determination processing giving preference to the number of pages shown in FIG. 29 is performed.

In FIG. 30, reference numeral 2601 denotes an example of templates to be used and masters to be inserted and the number of pages specified by the user (here, "3").

Reference numeral 2602 denotes the image of a list of combinations enumerated at step S601 in FIG. 29. Reference numeral 2603 denotes the image of the combination of templates determined finally at step S603 in FIG. 29 and masters outputted actually.

FIG. 31 is a diagram showing an example of the image of a catalog generated at S406 in FIG. 24 based on the data file for insertion generated finally at the catalog insertion determination processing giving preference to the number of pages shown in FIG. 29.

In FIG. 31, reference numeral 2701 denotes catalog data, and data corresponding to three pages is created in accordance with the specified settings. Since all the pages are specified to be outputted in color in this output, the actual data is color data. Actually, images obtained by rasterizing respective files of image data are inserted into areas including an image area of 2702.

The result of the black-and-white conversion at step S405 in FIG. 24 will be described below with reference to FIG. 32.

FIG. 32 is a diagram showing an example of the result of performing the black-and-white conversion processing at step S405 in FIG. 24 for the data file for insertion in FIG. 27.

The example in FIG. 32 shows the case where templates with priority below "2" have been converted to black-and-white templates. Therefore, as shown in Form Sections 2801 and 2802, the setting for "Color=" in "Template2.fcp" with the priority 2 and "Template3.fcp" with the priority 3 has been changed from "Color" to "Black&White".

The result of final output becomes the result shown in FIG. 30. However, the first and second pages of the catalog are in color, and the third and fourth pages are in black and white.

Though description has been made on processing for creating a catalog as an example in this embodiment, the present invention is not limited to generation of a catalog. The present invention is such that creates a product by inserting data into a template, and the product may be anything.

As described above, the Web application server 107 is a system for performing generation from templates and data to be inserted (including image data). This Web application server 107 causes data to be inserted to hold priority information and manages multiple templates corresponding to priorities. It is configured so as to generate, while automatically switching the catalog templates based on the priority information and the number of outputted pages specified by a user, an output in which specified data to be inserted are inserted into the templates.

Due to the configuration for performing output with the use of the templates corresponding to priorities of data to be inserted, the following advantages can be obtained.

It is possible to easily create an output in which high-priority data is highlighted (highlighted with color, the output size or the like), reducing the cost by specified quality levels, the specified number of pages and the like. Therefore, the conventional troublesome work required from a user can be eliminated.

For example, it is possible to easily create a catalog as business information and the like in which recommended articles with high priority are highlighted (highlighted with color, the output size or the like), reducing the cost by reducing the number of pages and the like.

The configuration and the content of the various data described above are not limiting, and it goes without saying that various configurations and content are possible according to applications or purposes.

An embodiment has been shown above. The present invention can be embodied, for example, as a system, an apparatus, a method, a program, a storage medium or the like. Specifically, the present invention may be applied to a system configured by multiple pieces of equipment or to an apparatus configured by a single piece of equipment.

Description will be made below on the configuration of the memory map of a storage medium storing various data processing programs which can be read by a server apparatus constituting, the system according to the present invention with reference to the memory map shown in FIG. 33.

FIG. 33 is a diagram illustrating the memory map of a storage medium (recording medium) storing various data processing programs which can be read by a server apparatus constituting the system according to the present invention.

There may be a case where information for managing the program groups stored in the storage medium, for example, version information and creators are also stored, and information dependent on the OS and the like of the program reading side, for example, icons for identifying and displaying the programs are also stored, though it is not especially shown.

Furthermore, data dependent on the various programs are also managed by the directory. There may be a case where programs for installing the various programs in a computer, programs for decompressing the installation programs when they are compressed and the like are also stored.

The functions in this embodiment which are shown in FIGS. 9, 21, 24, 25 and 29 may be executed by a host computer with the use of a program installed from the outside. In this case, the present invention is also applicable even when information groups including the programs are provided to an output device by a storage medium such as a CD-ROM, a flash memory and an FD, or from an external storage medium via a network.

It goes without saying that the object of the present invention is achieved by providing a storage medium in which the program codes of software realizing the functions of the embodiment described above are recorded, for a system or an apparatus, and then the computer (or the CPU or the MPU) of the system or the apparatus reading and executing the program codes stored in the storage medium.

In this case, the program codes themselves read from the storage medium realize the novel functions of the present invention, and the storage medium storing the program codes constitutes the present invention.

Therefore, any program form, such as an object code, a program to be executed by an interpreter and script data to be provided for the OS, is possible if it is provided with the functions as a program.

As the storage medium for providing the program, for example, a flexible disk, hard disk, optical disk, magneto-optic disk, MO, CD-ROM, CD-R, CD-RW, magnetic tape, non-volatile memory card, ROM, DVD and the like can be used.

In this case, the program codes themselves read from the storage medium realize the functions of the embodiment described above, and the storage medium storing the program codes constitutes the present invention.

In addition, as the method for providing the programs, it is possible to provide the programs by connecting to a website on the Internet with the use of the browser of a client computer and downloading the program of the present invention itself to a storage medium such as a hard disk from the website. It is also possible to provide the program by downloading a compressed file including an automatic installation function to a storage medium such as a hard disk from the website. Realization is also possible by dividing the program codes constituting the program of the present invention into multiple files and downloading each of the files from a different website. That is, a WWW server, an FTP server and the like which causes multiple users to download a program file for realizing the functional processing of the present invention with a computer are also included in the claims of the present invention.

The realization is also possible by encrypting the program of the present invention, storing it in a storage medium such as a CD-ROM and delivering it to users; causing a user who clears a predetermined condition is permitted to download key information for decrypting the encryption from the website via the Internet; and then causing the user to use the key information to execute the encrypted program and install it in a computer.

The functions of the embodiment described above are realized not only by executing the program codes read by a computer. It goes without saying that the configuration as described below is also included. For example, it goes without saying that the case is also included in which an OS (operating system) or the like which operates on the computer performs a part or all of the actual processing based on directions of the program codes, and the functions of the embodiment described above are realized by the processing.

Furthermore, it goes without saying that the case is also included in which the program codes read from the storage medium are written in the memory provided for an expansion board inserted in a computer or an expansion unit connected to a computer, and the CPU or the like provided for the expansion board or the expansion unit performs a part or all of the actual processing based on directions of the program codes written in the memory, and the functions of the embodiment described above are realized by the processing.

The present invention may be applied to a system configured by multiple pieces of equipment or an apparatus configured by a single piece of equipment. It goes without saying that the present invention can be adapted to the case of accomplishing it by providing a program for a system or an apparatus. In this case, by reading a storage medium in which a program represented by software for accomplishing the present invention is stored, to the system or the apparatus, the system or the apparatus can enjoy the advantages of the present invention.

The present invention is not limited to the above embodiment. Various variations (including organic combinations of the respective embodiments) are possible on the spirit of the present invention, and they are not excluded from the scope of the present invention.

Various examples and an embodiment of the present invention have been described. One skilled in the art will understand that the spirit and the scope of the present invention are not limited to the particular description in this specification.

Configurations obtained by combining the respective embodiments and the variations thereof which have been described above are also included in the present invention.

As described above, when various article catalogs are automatically generated, the server 107 causes each article master to hold information indicating priority, enables an administrator to change the priority according to the situation, and create and manage multiple catalog templates corresponding to priorities. The server 107 is configured to, in consideration of the priority, perform catalog output while automatically switching templates, or realizing catalog output taking into account color/black and white or the number of pages. Due to this configuration, it is possible to easily generate an output (catalog) in which high-priority data (information about recommended articles) is highlighted (highlighted with color, the output size and the like), without requiring a user to do a conventional troublesome work. It is also possible to reduce the cost by generation with a specified color attribute (color/black and white), the specified number of pages and the like.

According to this embodiment, output is performed with the use of form information according to the priority of data to be inserted. Therefore, it is possible to easily create an output in which high-priority data is highlighted (highlighted with color, the output size and the like), reducing the cost by the specified quality level, the specified number of pages and the like. It is also possible to eliminate a user's troublesome work which has been conventionally required.

Therefore, advantages can be obtained such as that it is possible to easily create a catalog for business information and the like in which recommended articles with high priority are highlighted (highlighted with color, the output size or the like), reducing the cost by limitation of the number of pages.

This application claims priority from Japanese Patent Application No. 2006-014193 filed Jan. 23, 2006, which is hereby incorporated by reference herein.

The invention claimed is:

1. An information processing apparatus that synthesizes multiple data in insertion areas defined in templates, comprising:
    a memory;
    a designation unit constructed to designate a condition of a number of sheets to be output as printed material;
    a first decision unit constructed to determine, from among a plurality of templates having respective priorities, a first combination of templates and a second combination of templates that satisfy the condition designated by the designation unit;
    a second decision unit constructed to select the first combination of templates when a number of templates having a highest priority included in the first combination of templates is larger than a number of templates having the highest priority included in the second combination of templates, and select the second combination of templates when the number of templates having the highest priority included in the second combination of templates is larger than the number of templates having the highest priority included in the first combination of templates, and
    a generation unit constructed to synthesize the multiple data into the insertion areas of the templates included in the combination selected by the second decision unit.

2. An output information generation method in an information processing apparatus that synthesizes multiple data in insertion areas defined in templates, said method comprising:
    a designation step of designating a condition of a number of sheets to be output as printed material;
    a first decision step of determining, from among a plurality of templates having respective priorities, a first combination of templates and a second combination of templates that satisfy the condition designated by the designation step;
    a second decision step of selecting the first combination of templates when a number of templates having a highest priority included in the first combination of templates is larger than a number of templates having the highest priority included in the second combination of templates, and selecting the second combination of templates when the number of templates having the highest priority included in the second combination of templates is larger than the number of templates having the highest priority included in the first combination of templates, and
    a generation step of synthesizing the multiple data into the insertion areas of the templates included in the combination selected by the second decision step.

3. A non-transitory computer-readable medium which stores a program for causing a computer to execute the output information generation method according to claim 2.

* * * * *